United States Patent [19]

Oiwa et al.

[11] Patent Number: 5,127,140

[45] Date of Patent: Jul. 7, 1992

[54] NUMERICALLY-CONTROLLED LATHE, NUMERICALLY-CONTROLLED DEVICE THEREFOR AND PROCESSING PROCEDURE THEREBY

[75] Inventors: Kazuhiko Oiwa, Abiko; Seishu Kawashima, Yachiyo; Takanobu Sato, Moriya; Akira Kosho, Noda; Atsuo Watanabe, Ushiku, all of Japan

[73] Assignee: Hitachi Seiki Co., Ltd., Chiba, Japan

[21] Appl. No.: 629,774

[22] Filed: Dec. 18, 1990

[30] Foreign Application Priority Data

| Dec. 18, 1989 | [JP] | Japan | 1-326091 |
| Jan. 12, 1990 | [JP] | Japan | 2-3375 |
| Jul. 10, 1990 | [JP] | Japan | 2-180430 |
| Sep. 10, 1990 | [JP] | Japan | 2-237010 |
| Sep. 19, 1990 | [JP] | Japan | 2-247148 |
| Sep. 25, 1990 | [JP] | Japan | 2-252014 |
| Oct. 8, 1990 | [JP] | Japan | 2-270167 |

[51] Int. Cl.$^5$ .............................................. B23B 7/00
[52] U.S. Cl. .................................. 29/27 C; 29/39; 82/120; 82/121; 82/129; 364/474.11
[58] Field of Search ............... 82/129, 118, 119, 120, 82/121; 29/27 C, 39; 364/474.11, 474.15, 474.36

[56] References Cited

U.S. PATENT DOCUMENTS

| 4,457,193 | 7/1984 | Matthey | 82/129 |
| 4,612,832 | 9/1986 | Ushigoe et al. | 82/129 |
| 4,683,786 | 8/1987 | Kersten et al. | 82/118 |
| 4,719,676 | 1/1988 | Sansone | 82/129 X |
| 4,862,381 | 8/1989 | Shibata | 364/474.36 |
| 4,949,444 | 8/1990 | Kojima | 29/27 R |

FOREIGN PATENT DOCUMENTS

| 3626324 | 2/1988 | Fed. Rep. of Germany | 82/129 |
| 0130103 | 6/1987 | Japan | 82/118 |
| 2178991 | 8/1986 | United Kingdom . | |
| 8910223 | 11/1989 | World Int. Prop. O. | 82/129 |

Primary Examiner—Larry I. Schwartz
Assistant Examiner—Julie R. Daulton
Attorney, Agent, or Firm—Armstrong, Nikaido, Marmelstein, Kubovcik & Murray

[57] ABSTRACT

The present invention relates to a numerically-controlled lathe, a numerically-controlled device therefore and a procedure for processing a workpiece thereby. An object of the invention is to provide a numerically-controlled lathe adapted to designate one of two spindles and three tool rests and a procedure for processing a workpiece thereby. The numerically-controlled lathe of the invention includes a first headstock 2, a second headstock 5, which is positioned so as be facing relationship with the first headstock and drivably controlled in at least a single direction, a first tool rest 11 drivably controlled in at least two directions which intersect each other for processing a workpiece, a second tool rest 20 drivably controlled in at least two directions mainly for processing a workpiece mounted on the second spindle 23, and a third tool rest 30 drivably controlled in at least two directions and having two axes which are intersecting each other for processing the workpiece in association with the first tool rest 11 or second tool rest 20, by aiding a processing operation executed by the first spindle 22 or the second spindle 23.

2 Claims, 15 Drawing Sheets

| THIRD SYSTEM NC PROCESS PROGRAM \ SYSTEM SELECTION SWITCH | 1 | 2 | 3 | 1+2 | 1+3 | 2+3 | 1+2+3 |
|---|---|---|---|---|---|---|---|
| O1234 : [THIRD SYSTEM PROGRAM] | NOT EXECUTED | NOT EXECUTED | ~~ EXECUTED ~~ | NOT EXECUTED | ~~ EXEC-UTED ~~ | ~~ EXEC-UTED ~~ | ~~ EXECUTED ~~ |
| GXXX : [FIRST + THIRD COMPLEX PROCESS PROGRAM] | | | | | | | |
| GYYY : [SECOND + THIRD COMPLEX PROCESS PROGRAM] | | | | | ~~ EXEC-UTED ~~ | ~~ EXEC-UTED ~~ | |
| GXXX : [FIRST + THIRD COMPLEX PROCESS PROGRAM] | | | | | | | |
| GZZZ : [THIRD SYSTEM PROGRAM] | | | ~~ EXECUTED ~~ | | ~~ EXEC-UTED ~~ | ~~ EXEC-UTED ~~ | ~~ EXECUTED ~~ |
| M30 : | | | | | | | |

NUMERICALLY-CONTROLLED LATHE, NUMERICALLY-CONTROLLED DEVICE THEREFOR AND PROCESSING PROCEDURE THEREBY

FIELD OF THE INVENTION

The present invention relates to a numerically-controlled lathe, a numerically-controlled device therefor and a processing procedure thereby. More specifically, the present invention relates to a numerically-controlled lathe, a numerically-controlled device therefor and a processing procedure thereby, wherein said numerically-controlled lathe comprises two headstocks arranged on a bed facing each other, and three tool rests corresponding to these two headstocks, and wherein said lathe further comprises a first tool rest mainly for processing workpieces mounted on a first headstock, a second tool rest mainly for processing workpieces mounted on a second headstock, and a third tool rest for aiding the processing operation to be executed by said first or said second tool rests.

DESCRIPTION OF THE PRIOR ART

A numerically-controlled-lathe is known, wherein said lathe comprises two headstocks, each of which is arranged on the axis of the spindle to be movable in the direction of the Z axis so that chucks may be positioned facing each other, and two tool rests which correspond to the headstocks. Such a lathe is known from various literature, such as U.S. Pat. No. 4,949,444 (Yamazaki Mazak Corporation). This numerically-controlled lathe is adapted to process a workpiece held in position between chucks of the spindle by causing its numerically-controlled device to undertake an interpolation control in the directions of the X and Z axes.

This type of numerically-controlled lathe is known for the fact that it can perform other secondary processing operations, such as milling, drilling and thread cutting operations, in addition to the turning operation. In a numerically-controlled device for the numerically-controlled lathe, which comprises two or more independent processing stations in the single numerically-controlled lathe, a control system switching mechanism is often used to switch the control system in the numerically-controlled device, i.e., to switch processing operations alternatively between a first operating system which serves for the processing of the workpiece in the first station and a second system which serves for the processing of the workpiece in the second operating station. This mode of operation requires a complex ordering sequence and it is a cumbersome task to prepare a program, making it inconvenient.

Moreover, since two headstocks and a plurality of tool rests are often arranged in a single numerically-controlled lathe, the entire lathe, consequently, tends to require a complex construction. Thus, an operator may feel burdened during operations and chips may tend not to be splashed outside the bed smoothly.

In a numerically-controlled lathe comprising two headstocks opposing each other, the first step processing is carried out at the first headstock side, and after being completed, the workpiece is delivered to the second headstock side wherein the second step processing operation is carried out.

In order to improve the processing efficiency of the numerically-controlled lathe of this type, it is necessary to control the lathe so that there is no difference in the length of the time needed to process a workpiece the first and the second headstocks, thereby eliminating dead time. To this end, such approaches have been disclosed in several pieces of literature, such as Japanese Patent Application Publication No. SHO. 63-169251 (Yamazaki Mazak Corporation), wherein a numerically-controlled device is used to allot the processing time so that the entire processing operation may be carried out separately in the first and the second steps, with the processing times of these steps being made substantially uniform.

However, even if the processing operation can be optimally allotted in steps, various restricting factors make it rather difficult to design the processing operation so that the length of time needed to complete the processing operations may be made substantially equal between the first and the second steps.

For instance, it is imperative to process in the second step the portion of the workpiece which has been held between chucks in the first step. The rough-processing and the finished processing operations may not be interchangeably executed, that is, the workpiece may not be subject firstly to the finished-processing operation in the first step, and then to the rough-processing operation in the second step. There is no possible choice except to adopt such an operational sequence by which the front surface of the workpiece is processed in the first step and the back surface of the workpiece is processed in the second step.

In a numerically-controlled lathe comprising a numerically-controlled device with an automatic programming function incorporated therein, an arrangement has been adopted which makes it possible to compute and decide data necessary for the lathe to process two workpieces simultaneously, but providing a third tool rest to aid processing operations to be executed by two processing portions as needed, has never been arranged.

For this type of automatic lathe wherein two or more independent processing portions can be available in a single numerically-controlled lathe, a complex processing program is required, because two headstocks and a plurality of tool rests must be arranged in the single numerically-controlled lathe. Consequently, the number of the processing tool to be actuated being wrongly inputted into a program by mistake during the programming has frequently occurred.

In the numerically-controlled lathe having two headstocks and three tool rests as, for example, the one being proposed by the instant applicant, a third tool rest is selectively used to aid in the processing operation of the workpiece loaded on the first or the second headstock. As a consequence, a confusion often occurs in preparing a program as to whether the first headstock or the second headstock should be aided by the third headstock, resulting in the periodic collision of headstocks due to mistakenly designated data in the coordinate system.

In order to reduce the length of time needed by a lathe to process a workpiece, it can be suggested to increase the feeding velocity of the workpiece, but such a solution may be limited due to various restricting factors and control requirements needed in the driving mechanism, such as the servo-motor. Furthermore, it may also be possible to eliminate the above-mentioned drawback by modifying the driving mechanism or by increasing the dimensions of the motor and the like, but such an approach can only be taken at an increased expenditure. In a numerically-controlled lathe comprising two or more tool rests, the length of time needed to process a workpiece may be reduced by processing the same workpiece simultaneously by means of two or more tool rests.

However, such a simultaneous processing operation is not easy to carry out. In a prior art, where a single workpiece is to be processed simultaneously using a numerically-controlled lathe comprising two or more tool rests, it has been customary for a programmer to prepare two or more processing programs separately with a waiting time taken to execute one program after another in response to an order such as M-code order (Miscellaneous Functions). This is because of the inconsistency of the time frequency needed to process the workpiece between these two tools rests. A sophisticated programming technique is needed to allow such a period of waiting for the lathe.

When this technique is applied to this invention, confusion may take place in specifying as to whether the first or the second headstock should be aided by the third tool rest to provide its processing operation for the workpiece, and therefore a collision of headstocks may take place due to a wrongly designated coordinate system being applied to the headstocks being moved. The processing program must be prepared with the above-described matters taken into consideration, and thus the lathe has its operating efficiency impaired.

Various methods are used to check the processing program which has been prepared to drive these numerically-controlled lathes in order to confirm whether there is any programming mistake, any interference between the tool and the tool rest, and the like. One such method is to check the program for mistakes by mapping a locus along which the tools move during operation. However, it is a common practice for an operator to finally check the program by operating the numerically-controlled lathe actually in accordance with the particular processing program and visually observing the results.

In the numerically-controlled lathe with opposed spindles comprising two headstocks as above-described, it is a common practice for operators to check each of the tool rests individually for any improper function while it is being operated independently, without moving other tool rests, and then to check all of the tool rests for any abnormality by actuating them to operate in a full-automatic mode. However, to operation of three tool rests independently and then their operation in a full-automatic mode is not adequate enough to serve as a satisfactory program check in the numerically-controlled lathe of the type, which comprises two opposing headstocks, tool rests each corresponding with these headstocks and a tool rest serving to aid the processing operation to be executed by the two headstocks.

That is, since each of the tool rests which aid the processing operations to be executed by the two headstocks has a moving area which overlaps with those of the other two tool rests, they must be designed such that interference, i.e., a contact and a collision between the tool rests, can be avoided. However, such interference between each of tool rests can not be checked for in an independent operating mode. Moreover, it is extremely difficult for an operator to check three tool rests simultaneously for any kind of mutual interference in a full-automatic mode. Besides, when it is desired to process a workpiece merely by using one headstock, the lathe must be run in a full automatic mode, allowing the other headstock to do a processing action simultaneously. Thus, the tool rests must wait for each other before processing a workpiece, causing a period of waiting for the arrival of another tool rest, and thereby reducing the processing efficiency of the lathe.

SUMMARY OF THE INVENTION

The novel numerically-controlled lathe and its numerically-controlled device of the present invention can solve the various above-described problems in the prior art.

The present invention provides a numerically-controlled lathe, wherein the lathe comprises:

A numerically-controlled lathe, comprising:

a bed (1);

a first headstock (2) fixed to said bed;

a first spindle (22) freely and rotatably supported in said first headstock (2);

a first spindle motor (4) for rotatably driving said first spindle (22);

a second headstock (5) arranged on said bed (1) to face said first headstock (2) and being drivably controlled in a same direction with an axis of said first spindle (22);

a first servo-motor (6) for driving said second headstock (5) in at least said same direction;

a second spindle (23) with a same axis of said first spindle (22) freely and rotatably supported in said second headstock (5);

a second spindle motor (9) for rotatably driving said second spindle (23);

a first tool rest (11) which is drivably controlled in at least two perpendicularly intersecting directions, said first tool rest for processing a workpiece mounted on said first spindle (22);

second and third servo-motors (10, 17) for driving said first tool rest (11) in at least said two perpendicularly intersecting directions;

a second tool rest (2) drivably controlled in at least a single direction for processing the workpiece mounted on said second spindle (23);

a fourth servo-motor for driving said second tool rest in at least said single direction;

a third tool rest (3) drivably controlled in at least two perpendicularly intersecting directions for processing the workpiece simultaneously in association with said first tool rest (11) or said second tool rest (2) to aid processing of the workpiece on said first spindle (22) or said second spindle (23) during its processing operation of the workpiece;

a fifth and a sixth servo-motors (33, 37) for driving said third tool rest (30) in at least said two perpendicularly intersecting directions;

a numerically-controlled device (41) which is adapted to select a third system processing operation in order to aid a first system processing operation for processing the workpiece of said first spindle (22) by means of said first tool rest (11), or a second processing system for processing the workpiece of said second spindle (23) by means of said second tool rest (20), and which is adapted control the simultaneous operation of said first system processing operation with the second system processing operation, or said first processing operation with said third system processing operation, or said second system processing operation with said third system processing operation, or said first system processing operation, said second system processing operation and third system processing operation.

OBJECTS AND ADVANTAGES OF THE INVENTION

The present invention has been made with the above as a technical background, and achieves many objects as described below.

It is an object of the present invention to provide a numerically-controlled lathe and its numerically-controlled device which can selectively order any of the headstocks and tool rests to make it operative.

It is a further object of the present invention to provide a numerically-controlled lathe and its numerically-controlled device which an operator can operate conveniently by selecting the optimum arrangement of beds, headstocks and tool rests.

It is a further object of the present invention to provide a numerically-controlled lathe which is constructed in such a way that it can arrange beds, headstocks and tool rests in an optimum manner so as to improve the discharging efficiency of chips.

It is a further object of the present invention to provide a numerically-controlled lathe comprising two spindles for processing two workpieces simultaneously, along with a procedure for processing a workpiece in an efficient manner and a numerically-controlled device therefor, wherein a third tool rest is provided which can process any of the workpieces clamped between two spindles, this third tool rest being capable of aiding the processing operation of the other tool rests, whereby balancing the time needed to process a workpiece is balanced so as to be substantially uniform between the first and the second spindles, thereby realizing a very efficient processing operation.

It is a further object of the present invention to provide a numerically-controlled lathe comprising two spindles and three tool rests, wherein a third tool rest may be actuated automatically to aid a processing operation executed by a first tool rest or a second tool rest merely by selecting the third tool rest in accordance with a processing program, and then switching the coordinate system for the third tool rest to that of the first too rest or the second tool rest.

It is a further object of the present invention to provide a procedure for processing a workpiece simultaneously through a numerically-controlled lathe comprising a plurality of tool rests, by which a processing program can be prepared easily and with a lower program capacity requirement.

It is a further object of the present invention to provide a procedure for establishing a processing coordinate system through a numerically-controlled lathe comprising two spindles and three tool rests, wherein a third tool rest is able to automatically select the spindle to be aided for its processing operation and then the coordinate system in the numerically-controlled lathe can be changed accordingly.

It is a further object of the present invention to provide a numerically-controlled lathe comprising two spindles and a plurality of tool rests, and its operating procedure, wherein a step is taken to easily check the processing program for any defect and then to execute a turning operation on a workpiece for trial.

It is a further object of the present invention to provide a numerically-controlled lathe and its operating procedure, by which an improved operating efficiency may be realized.

An advantageous effect of the present invention is that an operator may operate the lathe efficiently and remove chips in an improved manner.

A further effect of the present invention is that is possible to make the time needed in the first step and the second step substantially equal, thereby improving the processing efficiency.

A further effect of the present invention is that the third tool rest may serve to aid the other tool rests efficiently by storing and automatically computing the work data, i.e., information as to the blank material, finishing operational procedure, steps needed and modifications, and other functional data to be used by each of the tool rests.

A further effect of the invention is that any tool rest may be selectively used to aid the processing operation by specifying a tool merely by the entry of T-codes (the tool function in the numerically-controlled program) into the processing program, and therefore a straightforward processing program can be prepared, reducing mistakes in preparing the program.

A further effect of the present invention is that a simultaneous processing of the workpiece may be actuated merely by the entry of codes into the processing program, when the code is needed to actuate the third tool rest to aid the processing operations executed by the first spindle and the second spindle, and moreover a feed speed as well as a cutting depth may be doubled to improve the processing efficiency. As a result, the processing program to be used to process the workpiece simultaneously may be made straightforward, resulting in the speed of a simultaneous processing operation being made twice as fast as that of the prior art.

A further effect of the present invention is that a follow-up control is automatic and is effective for the coordinate system of the third tool rest despite the movement of the second spindle, in the case where the third tool rest is functioning to aid a processing operation to be executed by the first and the second tool rests, thereby liberating the operator from the burden of compensating for the amount of the tool's movement corresponding to the shift of the second spindle, the operating efficiency and the safety of the operator being improved thereby.

A further effect of the present invention is that a portion of the processing program can be skipped over depending on the operating mode desired, and therefore a program check and a trial turning operation may be freely actuated, thereby ensuring improved operational convenience and thus increasing the processing efficiency.

BRIEF DESCRIPTION OF THE DRAWINGS

FIG. 2 (b) is a front elevation of FIG. 1;

FIG. 2 (c) is a lateral side view of FIG. 2(a);

FIG. 17 is a view illustrating a third system NC program.

FIRST EMBODIMENT

Figure 1:
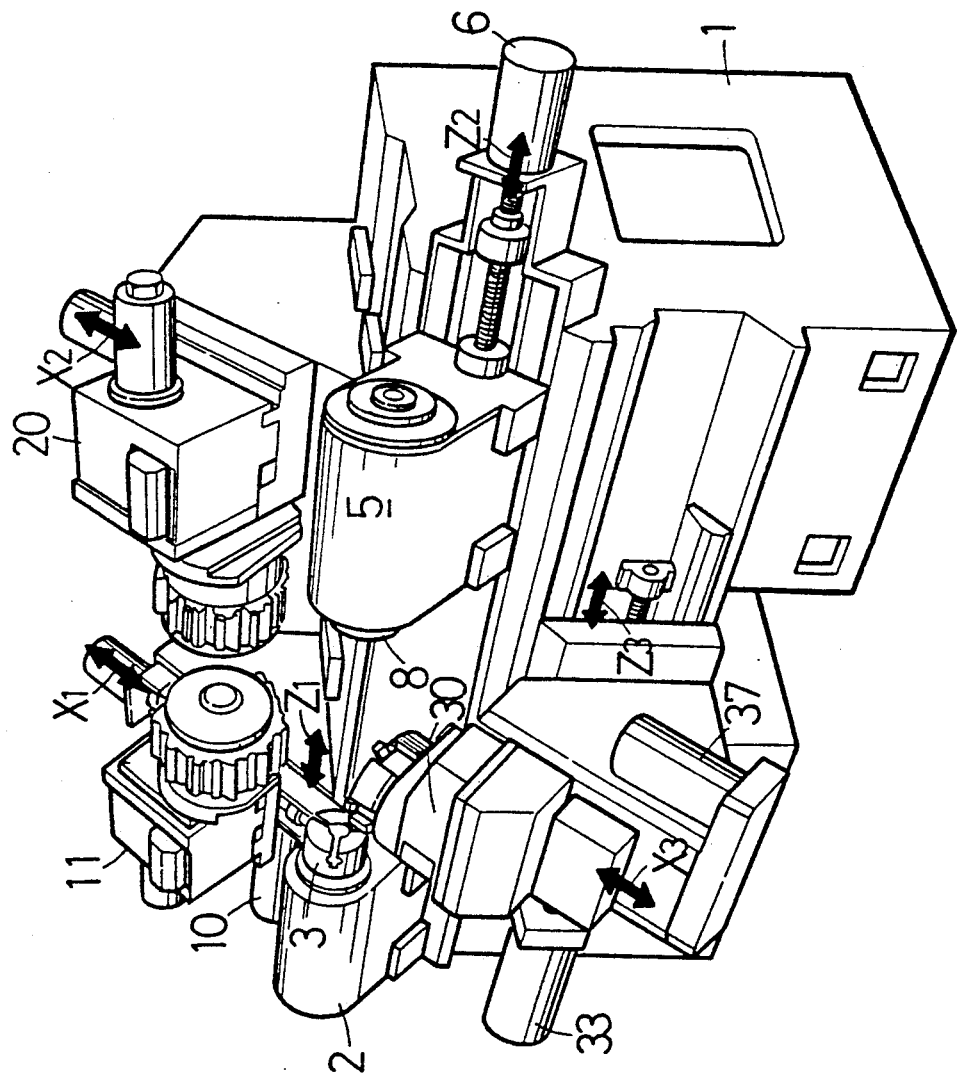
FIG. 1 is a perspective view of the numerically-controlled lathe of the present invention.

This embodiment will be described hereinbelow, with reference to the accompanying drawings. FIG. 1 is a transparent view illustrating a representative example of the numerically-controlled lathe of the present invention, whereas FIG. 2(a), FIG. 2(b) and FIG. 2(c) are projection views of FIG. 1, and FIG. 3 is a cross-sectional view along line 3—3 of FIG. 2(b).

The operation of the numerically-controlled lathe will now be described, with reference to FIG. 1, FIG. 2(a), FIG. 2(b), FIG. 2(c), and FIG. 3.

A bed 1 is a base constituting the body of the lathe, and is made of castings and steel materials, etc. A first headstock 2 is provided at one end of the bed 1. This first headstock 2 is not movable on the bed 1. Freely and pivotably supported in position in the first headstock 1 is a first spindle 22. The first spindle 22 is integrally provided at its tip with a first chuck 3 which serves to clamp a workpiece. The first spindle 22 is rotatably driven by a first spindle motor 4.

The first spindle 22 is provided with a rotary indexing control system. This rotary indexing control system is actuated by controlling the rotation of the first spindle motor 4, or of an alternative indexing motor which is separately provided. A second headstock 5 is provided in position where it faces the first headstock 2. The second headstock 5 is freely and movably provided on the inclined guide surface 7 of the bed 1.

The movement of lined guide surface 7 is carried out by means of a $Z_2$-servo-motor 6 via a feed screw 6a. This moving direction is referred to herein as axis $Z_2$. The second spindle 23 is freely and rotatably provided in the second headstock 5. Provided at the distal end of the second spindle 23 is a second chuck 8. The second spindle 23 is rotatably driven by means of the second spindle motor 9. Provided on the bed 1 is a first reciprocating bed 13 which moves in a direction parallel to the direction of the axis of the first spindle 22.

A first cross-slide 14 which moves in the radial direction of the first spindle 22 is provided on the reciprocating bed 13. A first tool rest 11 having a hexagonal-shaped turret 15 is provided on the first cross-slide 14. The first reciprocating bed 13 is driven by means of the $Z_1$ servo-motor to move on the horizontal guide surface 12 of the bed 1 in the direction of the axis ($Z_1$) (see FIG. 4) parallel to the first spindle 22. This driving action of the first reciprocating bed 13 is carried out by means of a feed screw 10a (see FIG. 3) coupled with the $Z_1$ servo-motor 10.

Furthermore, the cross slide 14 is driven to move in the direction of the axis of $Z_1$ in which it crosses with axis line $Z_1$ perpendicularly, i.e., in a radial direction of the workpiece which is clamped by the first chuck 3. This movement is carried out by means of the $X_1$ servo-motor via a feed screw 17a. A turret body is hexagonal in shape, and has twelve tool-attaching surfaces formed on the outer periphery thereof. Consequently, 12 tools are usually attached on the turret body 15. A second tool rest 20 is arranged on the bed 1 in the same horizontal plane, where it faces the first tool rest 11.

The construction of the second tool rest is symmetrically relative to the first tool rest and these tool rests are substantially identical to each other. They are also identical in their functions, except for their axial arrangement, and so their further description is omitted herein. However, the second tool rest 20 does not move in the direction of the axis of the spindle in this embodiment. The third tool rest 30 is a tool rest provided on the front surface of the bed 1. A vertical guide surface 31 is formed on the front surface of the bed 1. Freely and movably provided on the vertical guide surface 31 is a third reciprocating bed 32 to be driven by means of the $Z_3$ servo-motor 33.

The output shaft of the $Z_3$ servo-motor is coupled with a feed screw 33a by means of which the third reciprocating bed 32 is driven to move in a direction parallel with the axes of the first and the second spindles. An $X_3$ guide surface 35 is formed on the third reciprocating bed 32, and a third cross slide 36 is provided to be freely movable in the direction of the $X_3$ axis on the $X_3$ guide surface 35. This driving of the third cross slide to move it in the direction of $X_3$ is actuated by means of the $X_3$ servo-motor 37 via a ball screw (not shown). A turret body 38 is formed on the third cross slide 36.

Six tools are attached on the outer periphery of the third cylindrical turret body 38. The third tool rest is intended to be used to aid the processing operations of the first and the second tool rests 11, 12. Specifically, they serve to aid the processing operations such as those used to process the inner and the outer diameters, a turning operation of the diameter (i.e., an operation to process an outer diameter by actuating two teeth simultaneously), and a thread cutting operation, along with measuring operations and to serve as a bar stop attached on the bar material feeding device. Mounted on the front surface of the second headstock 5 is a control panel for a numerically-controlled device for controlling the operations of the first tool rest 11, the second tool rest 20 and the third tool rest 30 as well as the second headstock 5.

BED CONSTRUCTION

Figure 2:
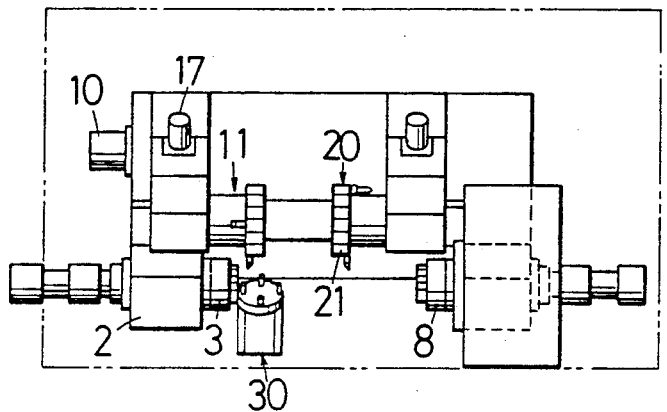
FIG. 2 (a) is a plan view of the numerically-controlled lathe of FIG. 1.
Figure 2:
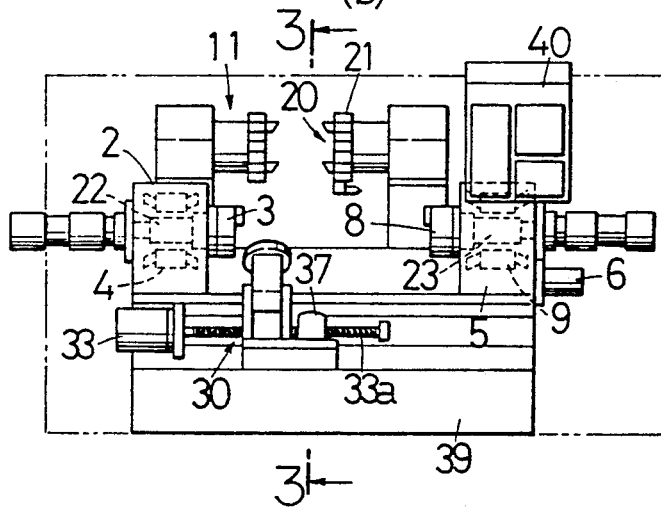
Figure 2:
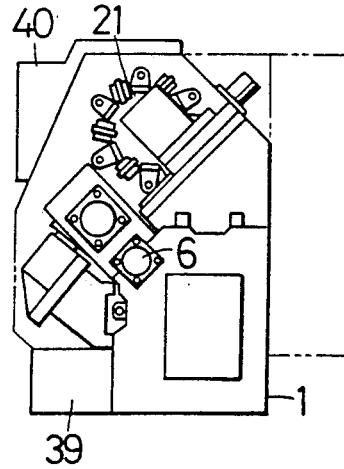
Figure 3:
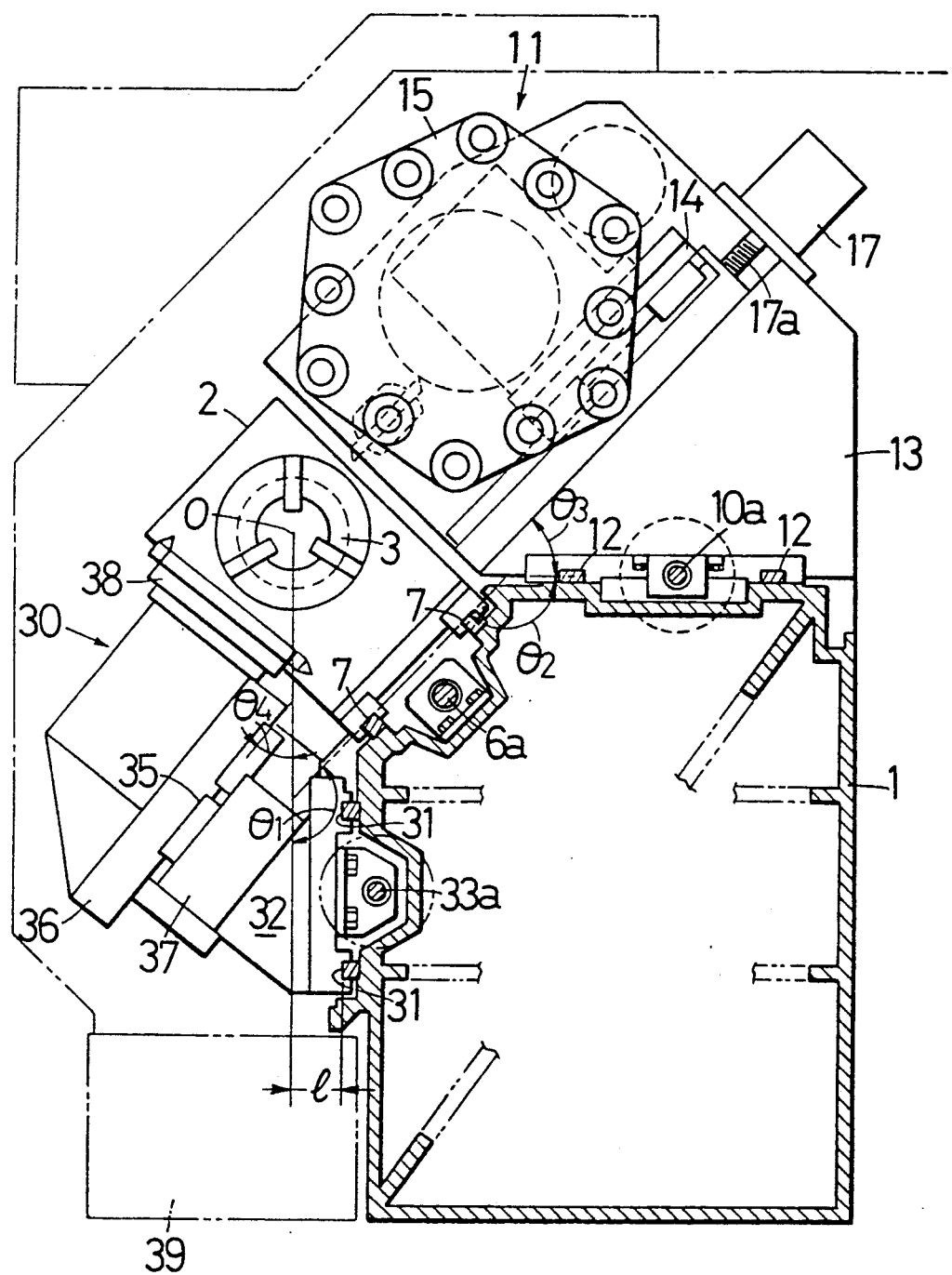
FIG. 3 is a cross-sectional view along line 3—3 of FIG. 2(b)
Figure 4:
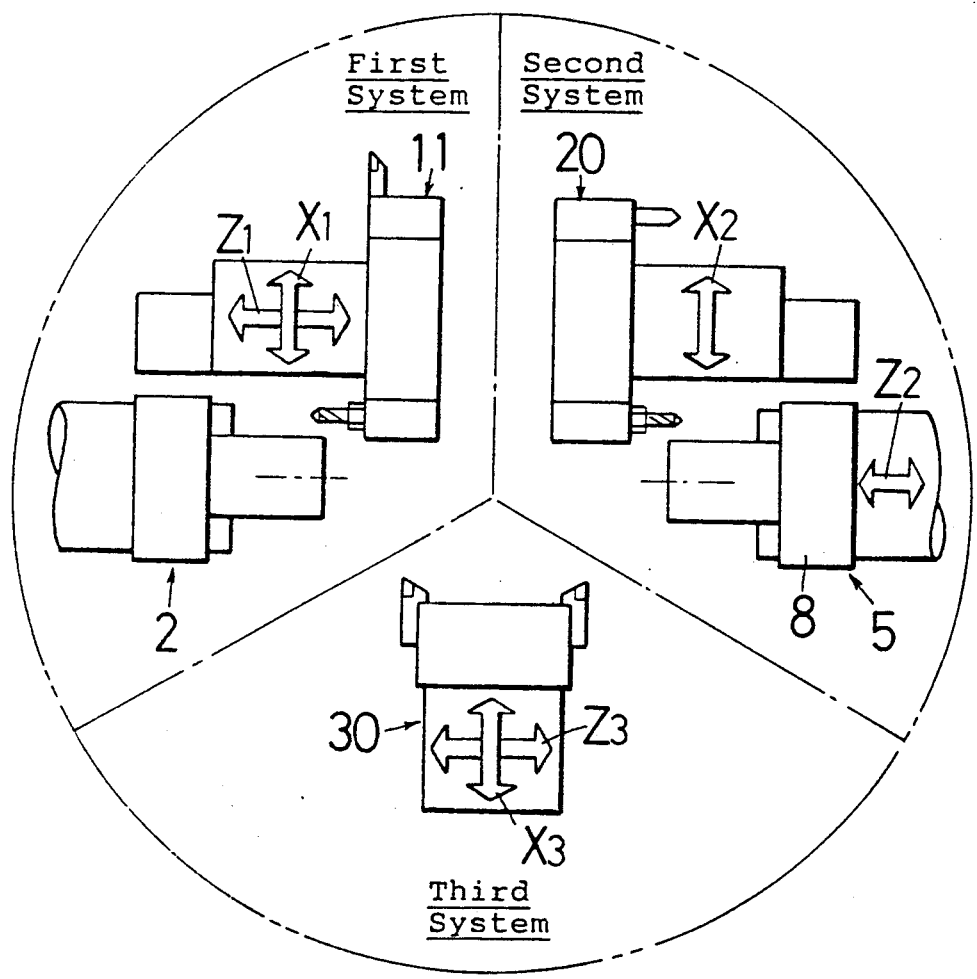
FIG. 4 is a view illustrating the nomenclature of the components of spindles and tool rests.

FIG. 3 is a cut-away cross-sectional view along line 3—3 of FIG. 2 (b), illustrating the cross-sectional construction of the bed 1. The outer periphery of the bed 1 is shaped in its cross-section in such a way that a substantially rectangular configuration has its angular portion partially bevelled. That is, horizontal guide surfaces 12, 12, included guide surfaces 7, 7 and vertical guide surfaces 31, 31 are formed on he outer surface of the bed 1. These vertical guide surfaces 31, 31 extend in a direction in which they are parallel with the direction of the gravity of the earth. Horizontal guide surfaces 12, 12 extend in a direction in which they normally run perpendicular to the direction of the gravity of the earth. Vertical guide surfaces 31, 31 are positioned to form an angle $\theta_1$ with inclined guide surfaces 7, 7 which are in turn arranged to form an angle $\theta_2$ with horizontal guide surfaces 12, 12.

The reciprocating bed 13 is mounted on the horizontal guide surfaces 12, 12 as described above. The reciprocating bed 13 is arranged to form an angle $\theta_3$ between a plane containing horizontal surfaces 12, 12 and a plane containing the guide surface of the first cross slide 14. The first cross slide 14 moves at the angle $\theta_3$ from the horizontal surface, and consequently it can move back and forth over the surface parallel to the inclined guide surface 7 in the direction of the axis of the first spindle 22. The first headstock 2 does not move relative to the bed 1 and is secured in position. The second headstock 5 is guided to move over the inclined guide surfaces 7, 7 as described before. The central rotary axis O of the first and the second spindles 22, 23 is spaced by the distance 1 away from the plane containing vertical guide surfaces 31, 31 in a direction in which these spindles are spaced remote from the bed 1.

As a consequence, chips which are produced during the turning operation for the workpiece clamped between chucks 3 and 8 are 10 caused to fall directly into a chip collection box 39 without coming into contact with the bed 1 or the third reciprocating bed 32. Thus, the heat which is developed and retained in the chips during the turning operation of the workpiece is not transmitted to the bed 1, the third reciprocating bed 32, etc. Moreover, there is an angle $\theta_3$ inclination, adopted to position the first and the second headstocks 2 and 5 respectively, and turret bodies 15 and 21 in mounting them on the first and the second tool rests 11 and 20 respectively, and consequently these units are located adjacent to an operator's side, thereby ensuring an easy operation of the lathe.

That is, the first reciprocating bed 13 is mounted to form an angle $\theta_3$ relative to a horizontal plane, and the third reciprocating bed 32 is arranged to form an angle $\theta_4$ relative to the vertical plane, whereas the first and the second headstocks 2 and 5 are installed on inclined guide surfaces 7, 7 forming an angle $\theta_1$ with the vertical plane, thus, the third tool rest 30, the first and the second tool rests are all arranged in positions where they may face each other around the first and the second headstocks 2 and 5. Above-described horizontal guide surfaces 12, 12 and the vertical guide surfaces 31, 31 are in horizontal and vertical planes respectively. However, the terms of horizontal plane and vertical plane are not used so strictly herein, but instead they may be used to represent such planes which are not strictly horizontal or vertical as long as the removal of chips and the operating efficiency is not substantially hampered. In particular, horizontal guide surfaces 12, 12 may be used to indicate an inclined surface, i.e., a surface having an angle $\theta_2$ greater than the above-described value.

SHAFT CONSTRUCTION

Several technical terms to be used hereinbelow to describe the embodiments of the invention are defined as follows; a is obvious from the above-description, the X axis and the Z axis represent radial directions in which the workpiece is made to move depending on the function and characteristics to be performed on the particular axis. Where the second headstock 5 which faces the first headstock 2 is caused to move in the direction of the axis of the spindle, such an axis is called herein as the $Z_2$ axis. In accordance with this rule, the X and the Y axes are referred to as the $X_1$ and $Z_1$ axes in the first tool rest 11, as the $X_2$ and $Z_2$ axes in the second tool rest 20 and as the $X_3$ and $Z_3$ axes in the third tool rest 30, respectively.

CONTROLLING PROCEDURE

When various axes are defined as above, the first system which functions as the feed shaft in the numerically-controlled lathe 41 (see FIG. 6) permits the first tool rest 11 to control two axes $X_1$ and $Z_2$ for processing the workpiece on the first spindle 22. The second system acts to control the $X_2$ axis of the second tool rest 20 and the $Z_2$ axis of the second spindle 23 for processing the workpiece on the second spindle 23. The third system serves to control the $X_3$ axis and the $Z_3$ axis of the third tool rest 23 so that it may aid the first spindle 22 or the second spindle 23 in their workpiece processing operations. It is possible for the above-described axes ($X_1$ and $Z_1$), ($X_2$ and $Z_2$) and ($X_3$ and $Z_3$) to be positionally interpolated with each other according to the functions to be performed by the numerically-controlled lathe. Where the second headstock 5 is driven as the axis $Z_2$, a simultaneous interpolation of three axes, i.e., the axis $X_3$, $Z_3$ and $Z_2$ can be achieved. In addition, the C axis function, i.e., the indexing function of the first and the second spindles 22 and 23, can be offered, thereby permitting three axes to execute the interpolation simultaneously.

The specification of tools in the processing program for each of the tool rests is carried out as follows; though the T-code is usually used to specify a particular tool, the first tool rest 11 is represented by the code T-0100~ and the second tool rest 20 by the code T-2100~ in this embodiment. The third tool rest 30 has two types of T-codes allocated therein. To aid the processing operation of the first spindle 30, the code T-5100~ is used, i.e., the T-code with the number 5000 is used, whereas the T-code with the number 5000 is used, whereas the T-code 7000~, i.e., the code with the number 7000, is used to aid the processing operation of the second spindle 23. Accordingly, a computer programmer can prepare a program for use in aiding the processing operation of the workpiece on the first spindle 22 and the second spindle 23 without worrying about the indexing position of the tool, unless the entry of a wrong T-code number takes place mistakenly.

COORDINATE AND COORDINATE SYSTEM

Figure 5:
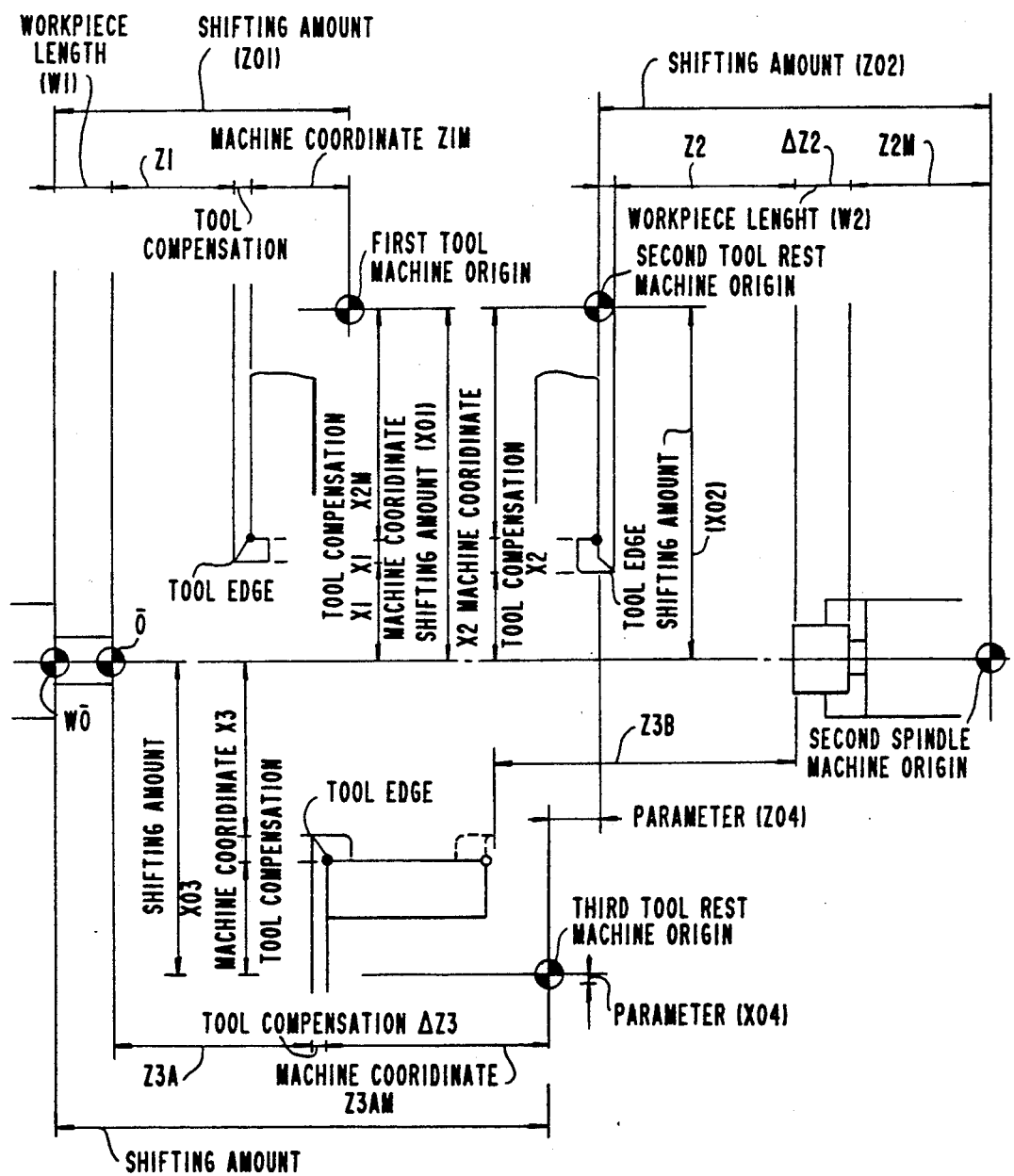
FIG. 5 is a view illustrating the relative positional relationships between each of the spindles and tool rests in a coordinate system.

FIG. 5 illustrates the positional coordinate relationships between each of the spindles and tool rests. The numerically-controlled device 41 to be described later can compute the amount of shifting between coordinates of different axis in each of the systems described above, by making computations as follows. The first system has the following relationship established as is shown in the drawing. However, the capitol O represents an origin, whereas the capitals WO represents an origin for a workpiece. The machine origin 1 is the one which is defined on the machine body.

$|X1| = |\text{Shifting Amount }(X01)| -$ $\quad |\text{Machine Coordinate }(X1M)| - |\text{Tool Compensation }(\Delta X1)|$ $|Z1| = |\text{Shifting Amount }(Z01)| -$ $\quad |\text{Machine Coordinate }(Z1M)| - |\text{Tool Compensation }(\Delta Z1)| -$ $\quad\quad\quad\quad\quad\quad\quad\quad\quad\quad\quad\quad \text{Workpiece Length }(W1)|$ A relationship as described below is present in the second system.

$|X2| = |\text{Shifting Amount }(X02)| -$ $\quad |\text{Machine Coordinate }(X2M)| - |\text{Tool Compensation }(\Delta X2)|$ $|Z2| = |\text{Shifting Amount }(Z02)| -$ $\quad |\text{Machine Coordinate }(Z2M)| - |\text{Tool Compensation }(\Delta Z2)| -$ $\quad\quad\quad\quad\quad\quad\quad\quad\quad\quad\quad\quad \text{Workpiece Length }(W2)|$ A relationship as described below is present in the second system, when the third tool rest 30 is operated to aid the processing operation executed by the first spindle 22.

$|X3| = |\text{Shifting Amount }(X3)| -$ $\quad |\text{Machine Coordinate }(X3M)| - |\text{Tool Compensation }(\Delta X3)|$ $|Z3A| = |\text{Shifting Amount }(Z03)| -$ $\quad |\text{Machine Coordinate }(Z3AM)| - |\text{Tool Compensation }(\Delta Z3)| -$ $\quad\quad\quad\quad\quad\quad\quad\quad\quad\quad\quad\quad \text{Workpiece Length }(W1)|$ A relationship as described below is present in the second system, when the third tool rest 30 is operated to aid the processing operation executed by the second spindle 23.

$|X3| = |\text{Shifting Amount }(X03)| -$ $\quad |\text{Machine Coordinate }(X3M)| - |\text{Tool Compensation }(\Delta X3)| +$ $\quad\quad\quad\quad\quad\quad\quad\quad\quad\quad\quad\quad |\text{Parameter }(X04)|$ $|Z3B| = |\text{Shifting Amount }(Z02)| -$ $\quad |\text{Machine Coordinate }(Z2M)| + |\text{Machine Coordinate }(Z3AM)| -$ $\quad |\text{Tool Compensation }(\Delta Z3)| - |\text{Workpiece Length }(W2)| +$ $\quad\quad\quad\quad\quad\quad\quad\quad\quad\quad\quad\quad |\text{Parameter }(Z04)|$

COMPENSATING TOOL AND TABLE

Each of the tools has a value for compensating a tool as above-described, there is a table in the numerically-controlled device to use for applying this compensation value. The tool coordinate may be compensated for in response to an order given from the processing program. Compensation values may be inputted and changed manually through keyboards, but a known automatic measuring device is used herein to input such a compensation value. The automatic measuring device is arranged so that it may compensate for each axis for the tool rests and the tools. The measured compensation data, which has been provided, is stored automatically in a compensation table which corresponds to each of the tools.

The numbers for the compensations in this table are determined so that they may be available in several sets by combining data concerning the turret surfaces, axial directions, etc., within an allowable storing capacity. However, all tool rests are designed to act in a pair in a number which is at least equal to the number of tools (the number of surfaces) in a corresponding manner. Compensation values for other standby tools may be addressed in a manner where an arbitrary number is ordered.

AIDING FUNCTION OF THIRD TOOL REST 30

As types of operations to be aided by the third tool rest, there are operations such as an aid for the workpiece processing operation, an aid for the measurement of the workpiece, and the jig-related aiding function in which the third tool acts as a stop, etc., for positioning the workpiece in these aiding services, the requirement and the type of aiding service needed are decided manually or automatically in accordance with a preset logic in which the type of processing operation, the number of steps, and the process time have been pre-selected beforehand.

As for the method for deciding a processing station to be aided by the third tool rest, in other words, a logic to decide which part of the workpiece should be processed by means of the third tool rest 30, there are two alternatives; one in which an arbiary portion of the workpiece is subject to an aiding service in accordance with the operator's or process controller's willingness, and another one in which the processing time of a workpiece is computed beforehand as a part of the tool moving schedule based on several factors including the size of the blank materials on the first and the second spindles, finishing workpiece dimensions, the processing capacity, the moving capacity, etc., and the type of processing operations and the portion to be aided ar then decided automatically. A method is provided in processing stations 54 and 55 in which an area, a range and stations to be aided are computed and decided for automatically computing and deciding information such as those relating to the workpiece blank material, the shape of the blank, the processing sections and process time, any limiting factors of the aiding operation given by the third tool rest 30 or by the processing capability (see FIG. 6).

METHOD FOR ORDERING EACH OF TOOL RESTS

A tool is specified for each of the tool rests in the processing program as follows;

The T-code is usually used to specify a tool, and the codes T-0100~ and T-2100~ are used to specify a tool for the first and the second tool rests respectively. However, these T codes are selectively used to specify a tool for the third tool rest.

To aid the processing operation of the first spindle 22, the code T-5100~, i.e., the T-code of the number in 5000S is used with the upper two digits being used to identify a tool. Similarly, the code T-7100~, i.e., the code of the number in the 7000S is used to aid the operation of the second spindle 23. In the meantime, the numbers of the two lower digits indicate numerals to compensate for a tool. Accordingly, a programmer can prepare a processing operation-aid program for the first and the second spindles 22 and 23 without concern about the indexing positions of the tool, unless this T-code is wrongly inputted by mistake in preparing the program. Compensation data for each of the tools is inputted in the following format as described below:

X_Z_R_C_H where Z indicates a compensation value for the axial directions; R is a nose radius; C is a control point (hypothetical edge as seen from the center of the nose radius R); H is the groove width of a groove cutting tool, etc.

NUMERICALLY-CONTROLLED DEVICE

Figure 6:
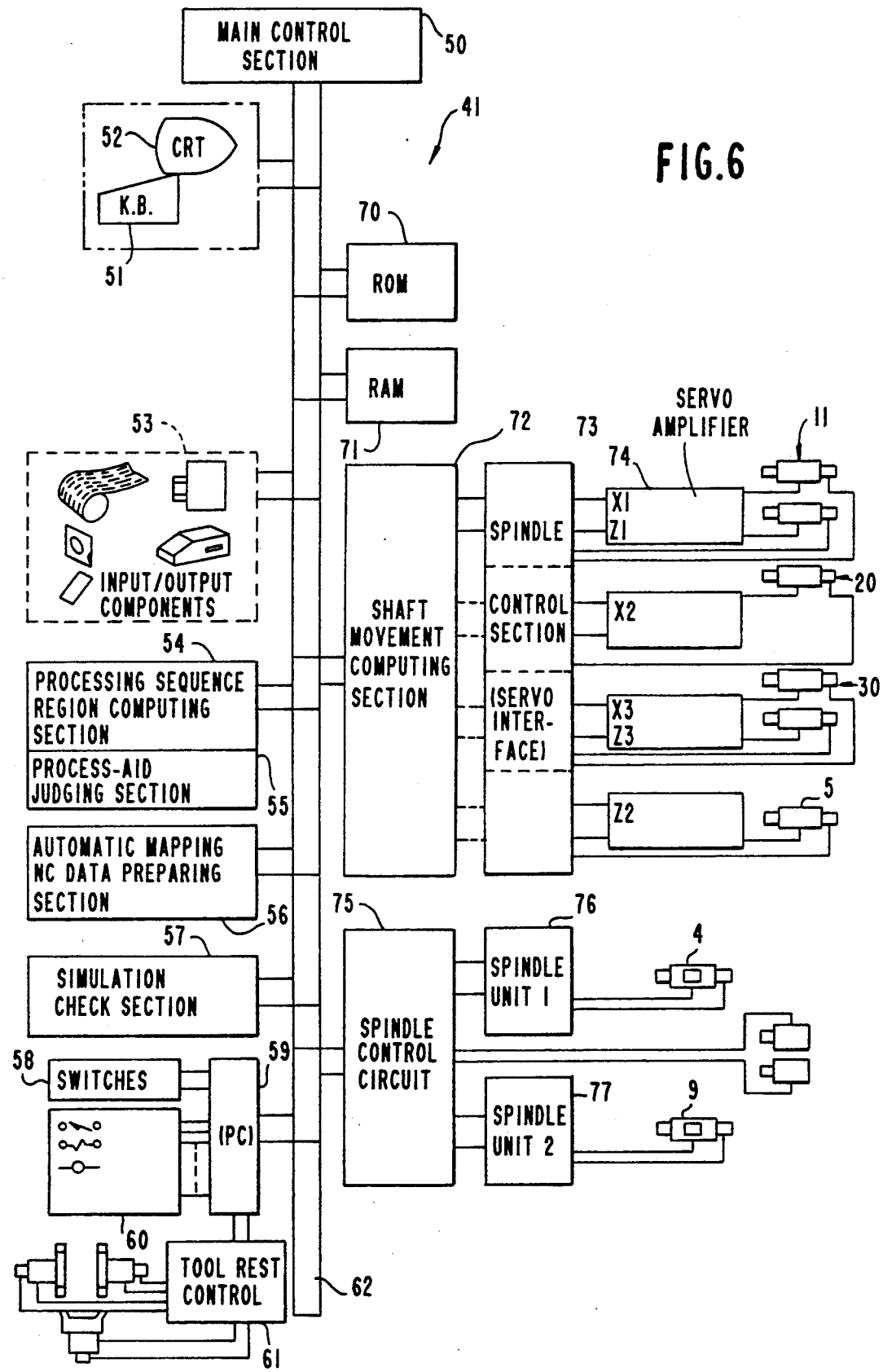
FIG. 6 is a functional block diagram generally illustrating a system for the numerically-controlled lathe.

FIG. 6 is a system block diagram illustrating how the numerically-controlled device 41 operates. A main control section 50 is a central control unit which is used to supervise the entire operation of the numerically-controlled device 41. Connected with the main control section 50 via a bus is an input/output component, various computing sections, a data generating section, a memory, and various sensors which are all supervised and controlled from this main control section 50. Connected with a display device 52 is a displaying device, such as a CRT, etc., and input components, such as a keyboard 51 and the like. The input/output device 53 is a known component which receives inputs from information media such as a paper tape, a floppy-disk, etc., and transmits such data to a storing and printing medium.

The processing sequencing and processing portion computing section 54 is provided to store and compute data which is used to decide the processing sequence of the workpiece, the type of tool to be used, the area to be processed, etc. Besides, the processing procedure and the processing portion computing section 54 rely on a workpiece blank material shape and its finishing shape to determine the area where a turning operation should actually be applied. In the process-aid determination section 55, data is treated and computation is carried out in order to automatically determine whether the third tool rest 30 should be actuated to aid the processing operation executed on the workpiece while it is being held in the first chuck 3 or the second chuck 8. This determination is carried out mainly depending on the processing time needed to process the workpiece in the first tool rest 11 and the second tool rest 20. However, this may be determined manually.

The automatic mapping and the NC data preparing section 56 operate to store and compute data which are used to prepare the NC data and then to display them on a display screen. In general, this is known as a program preparing position, where a program is usually prepared for the speech type numerically-controlled machine tools.

The simulation check section 57 operates to store data which are used to check for the processing condition of the lathe, to compute and then display the same in a simulated format, after the map and the NC data which had been prepared and drawn in the automatic mapping and NC data preparing section 56 has been displayed. Switches 58 are arranged in groups and used to issue an order to the programmable controller 59. The programmable controller 59 is a sequence-controller adapted to control the operation of the hydraulic equipment for machine tools and the like.

A sensor 60 is provided on the each section of the machine to detect and verify the movement and the positions of various sections. Information from these sensors 60 are detected by the main control section 50 via the programmable controller 59. The tool rest controller 61 operates to control the indexing action of the first tool rest 11, the second tool rest 20, the third tool rest 30, and the like. The ROM 70 functions to store the data and the program which are usable to actuate the main control section 50. The ROM 71 is a memory unit in which data is temporarily stored and retained while the input/output component 53 and the main control section 50 are operative. The RAM 71 operates to store a wearing compensation value and the like for each one of the tools attached to the respective tool rests 11, 20 and 30.

The first tool rest 11, the second tool rest 20, the third tool rest 30, the second headstock 5, etc., are controllably driven via the axial control section 73 and the servo-pump 74. Various data, such as those relating to the axial movement, the interpolation, the moving speed, the movable range, the compensation, etc., are issued from the main control section 50 through the axial movement computing section 72 to the axial control section 73. The main control circuit 75 is used to decide the speed of the spindle and perform a synchronous control so that the first and the second spindle driving units 76 and 77 are made to rotate in a synchronous manner to each other when so ordered.

The first and the second spindle motors 4 and 9 are made to rotate in a synchronous manner in response to an order issued from the main control section 50 via the main control circuit 75. Rotary tools (now shown) which are attached on the first and the second tool rests 11 and 20 are likewise made to rotate in a synchronous manner in response to an order issued from the main control section 50. The function of this synchronous control is usable in the thread cutting operation and the like.

SECOND EMBODIMENT

Figure 7:
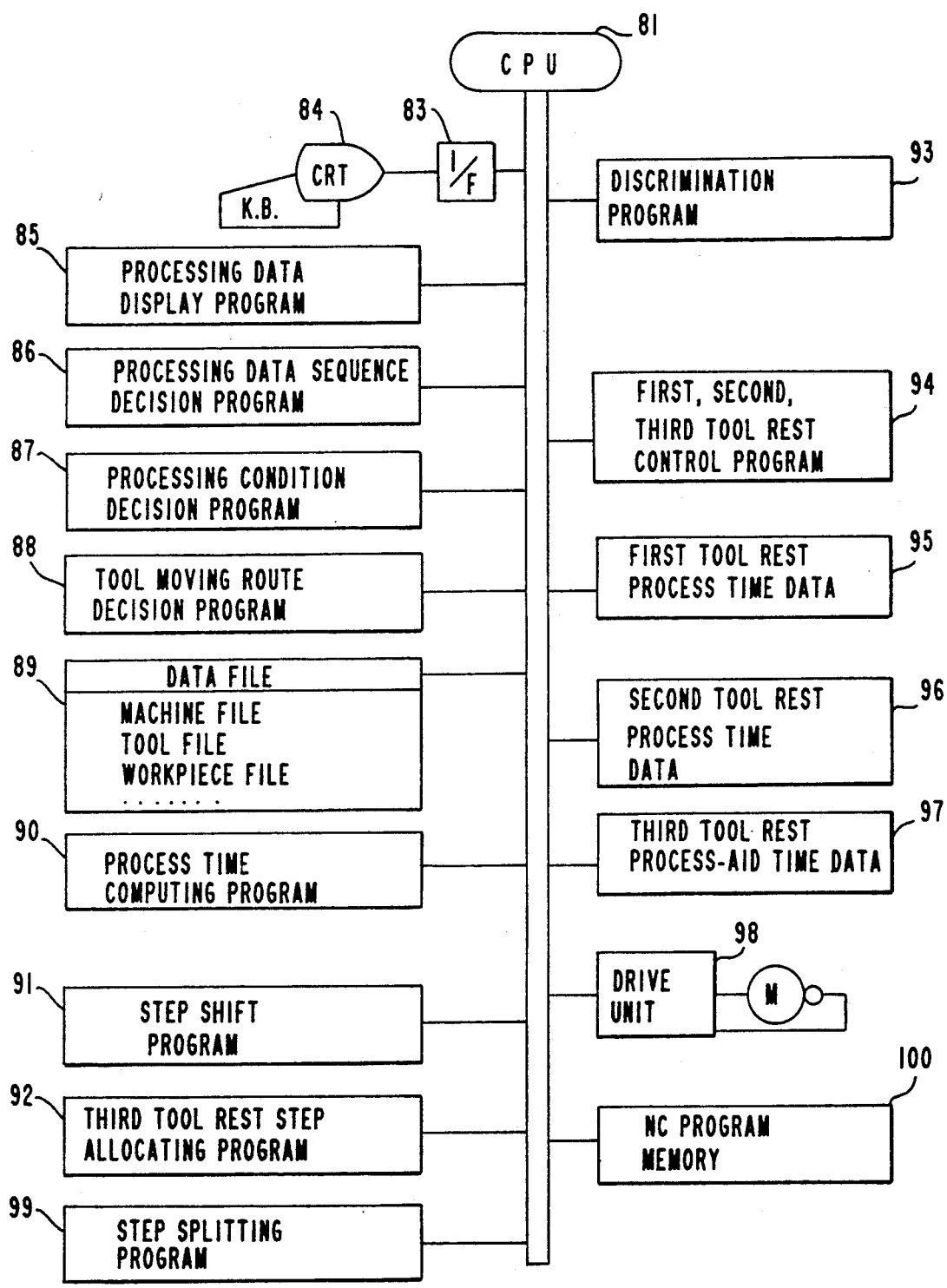
FIG. 7 is a functional block diagram generally illustrating a second embodiment of the system for the numerically-controlled lathe.

FIG. 7 is a block diagram illustrating the general view of the numerically-controlled device in accordance with a second embodiment of the invention. The construction of the machine tool is identical with that of the first embodiment, and so its detailed description is omitted herein. The CPU 81 is a central processing unit which operates to control and supervise the entire operation of the NC device. Connected with the CUP 82 is each of the memory regions and each of the control circuits via a bus 82. The input/output device 84 is connected with the bus via an interface 83 consisting of the display and driving section and the like. The input/output device 84 comprises a displaying section, a keyboard, etc. A processing program and a program for displaying the tool locus and other descriptive statements, etc., are stored and retained in the processing data displaying program memory region 85.

In the processing sequence decision program memory region 86, a program is stored and retained to decide a sequence to process the workpiece and select a proper tool i.e., a sequence is set up according to the type of processing operation to be executed, such as a drilling operation or an outer circumferential processing. A program decides various processing conditions, such as the feeding rate, the speed rate of the spindle, the cutting depth, etc. A program is stored and retained in the tool shift deciding program memory region 88, by which a decision is made as to the processing route along which the tool is shifted to process the workpiece, and the route which the tool must avoid taking to prevent interference, i.e, contact between the tool and chucks.

Various data which relate to the machine body, the tool, the workpiece, etc., are stored and retained in the data file memory region 89. A program is stored and retained in the processing time computing program memory region 90, by which the length of time needed to process the workpiece is computed. The process time is computed utilizing the speed of the spindles and the feed rate of the tool rests. Stored and retained in the process shifting program memory region 91 is a program usable to compare the process time designed to be taken between each of the first and the second tool rests 11 and 20 to allocate processing operations so that the process time may be equally balanced between the first and the second tool rests 11 and 20.

That is, the first and the second tool rests 11 and 20 are arranged so that the processing time between them may be equal. Stored and retained in the third tool rest process allocating program memory region 92 is a program which is used to actuate the third tool rest 30 to aid the processing operation executed either by the first or the second tool rests against a certain portion of the workpiece.

A program is stored and retained in the verification program memory region 93, which operates to check whether the processing time can substantially be made equal in the first spindle side 22 and the second spindle side 23 when the third tool rest is actuated to aid the processing operation carried out by the first or the second tool rests. A program is stored and retained din the tool rest control program memory region 94, which operates to prepared an NC program, taking into account the area where entry is not permitted its permissive control, etc., in order to present interference between the first and the second tool rests 11, 20 and 30.

The first tool rest processing time data memory region 95 is used to store and retain the processing time for the first tool rest. The second tool rest processing time data memory region 96 is used to store and retain the processing time for the second tool rest 20, which is computed in accordance with the processing time computing program. The third tool rest aiding processing time data memory region 97 is used to store and retain the processing time needed by the third tool rest 30, which is computed in accordance with the processing time computing program.

The step splitting program memory region 99 is used to store and retain a program for splitting operational procedures into two steps, i.e., one for processing in the first spindle 22 (first step) and the other step for processing in the second spindle (second step), both being initiated from the blank material finishing process to form the workpiece into a final configuration.

The NC processing program memory region 100 is used to store and retain the NC processing program for the first, the second and the third tool rests 11, 20 and 30. The drive unit 98 is a control circuit when serves to drivably control each of the servo-motors for the first, the second and the third tool rest 11, 20 and 30 and the servo-motor for the second headstock 5.

METHOD FOR PROCESS-AIDING OPERATION BY THE THIRD TOOL (1) Data

Some data have been stored beforehand in the data file memory region 89 as follows:

As for workpiece-related information, data are stored which include the blank material shape of the workpiece, the finishing shape, the step-discriminating procedure, materials, chucking allowances, finish machining allowances, etc., are stored.

As for tool-related information, data which include the body profile of each of the tools, the attachable tool shape, the processing capability, etc., are inputted and stored together with other tool rest-related information.

As for machine tool-related information, machine data which include the spindle output, acceleration and deceleration time, performance characteristics of each of the spindles (such as outputs, moving speed, acceleration and deceleration time, etc., are inputted and stored.

These data are used in preparing a processing program or in computing the length of time need by the processing operation. For instance, the following calculations are performed.

(2) Various Computations (1) The data are used to decide the tooling conditions in preparing a processing program. To decide the amount of turning operation and the tool used for it, data including the performance characteristics of the spindles, the work materials, the process precision, and performance characteristics of the feeding shaft are used.

(2) To compute the shifting distance and the length of the time needed to execute the turning operation, data used which include shifting limit speeds, the rough finishing allowance the tool length etc. are used.

(3) To compute the distance of the tool's return and the length of time needed for the processing operation, data which include the acceleration and deceleration time, the shifting speeds of the spindle, etc. are used.

(4) To compute the length of time needed to complete various tasks (the coding of M represents Miscellaneous Functions, S represents Special-Speed Functions and T represents Tool Functions for Numerical Control of Machines), data which contain the length of time, the amount of work needed to execute each of the operations, etc., are used.

In addition, these data are also used in computing the interference possibility for the tools, a tool length sufficient for indexing their positions, the tool diameter and the relative position between tools. Moreover, these data are also used in computing the compensation value for the feed rate override (manual change of the plotted value).

METHOD FOR ALLOCATING PROCESS TIME

Figure 8:
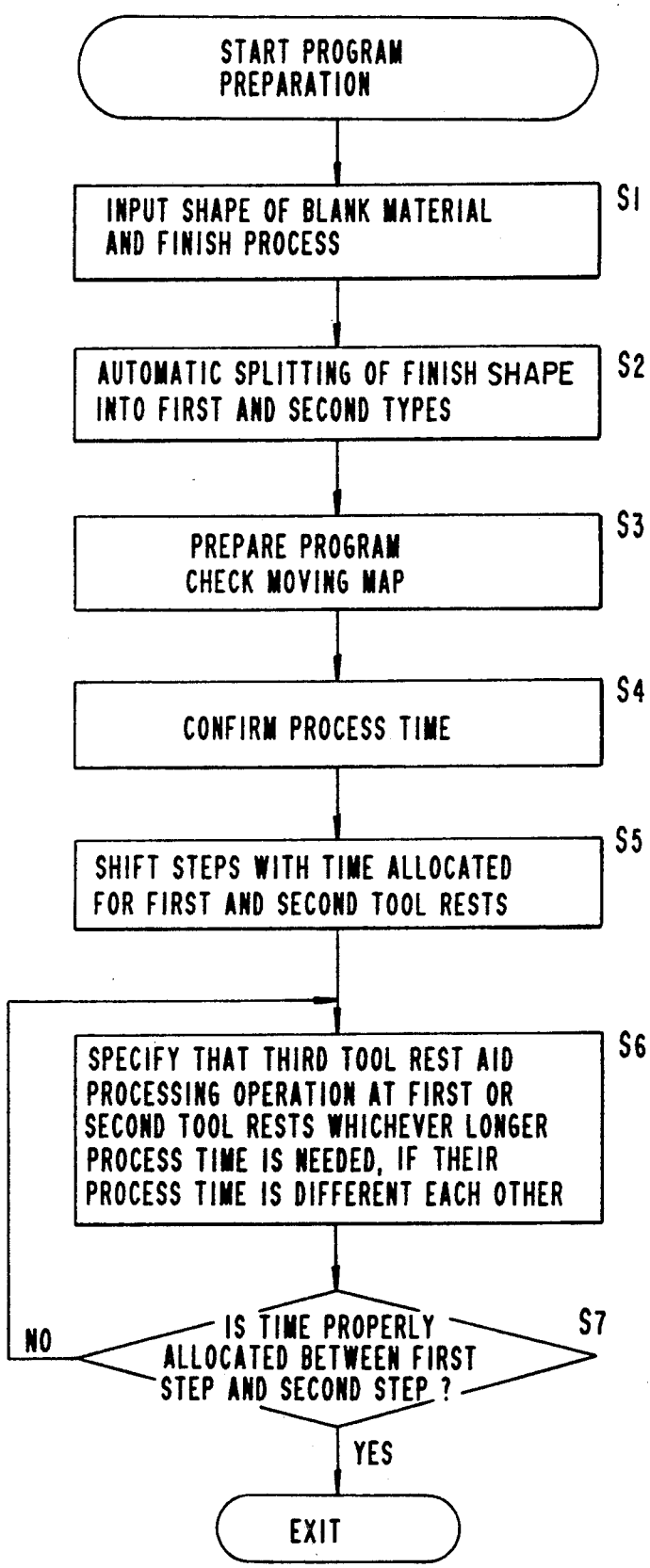
FIG. 8 is a flow-chart illustrating by way of example a computing procedure for aiding the processing operation of the tool rests.

FIG. 8 is a flow chart illustrating one example of the computing process which is used to aid the tool rests in executing their processing operations. First, various data which include the blank material shape of the workpiece to be processed and its materials are inputted and the finished shape, which represents the final shape for the workpiece, is inputted from the input/output component 84 (step $S_i$). Data which have been inputted are stored in the data file memory region 89. Then, the operational procedure is split automatically into two steps., the first step to be executed at the first chuck 3 and the second step to be executed at the second chuck 8, wherein a processing operation is carried out on the reverse side of the workpiece, depending upon the blank material shape and finishing shape (Step $S_2$).

This splitting procedure is undertaken by dividing the processing operation in accordance with the process-splitting program which is stored in the process splitting memory region 99. In the meantime, this procedure for splitting the operations into the first and the second steps may be done manually, rather than made in an automatic mode. Upon the process being split, the processing program for the first tool rest 11 and the second tool rest 20 is prepared utilizing various data which are stored in the data file memory region 89, such as the machine file, the tool file, the work file, etc., based upon the processing order decision program stored in the processing order decision program memory region 86, the processing condition decision program stored in the processing condition memory region 87, and the tool shifting route decision program stored in the tool shifting route decision program memory region 88.

Various methods are known b which these NC processing program are automatically prepared (such as those disclosed in Japanese Patent Publication No. SHO 60-135161, No. SHO 61-241043, No. SHO 61-274842, No. SHO 61-103213, etc.), but their detailed descriptions are omitted herein. The processing program itself or its tool moving locus, which has been prepared, is displayed on the screen of the CRT 84 by actuating the processing data displaying program which has been stored in the processing data displaying program memory region 85. Any mistake in preparing the program is checked at this point. Any processing sequence, tool moving locus, and/or processing conditions which are found to be improper will be corrected manually (step $S_3$), if necessary.

The process time computing program is then actuated in the process time computing program memory region 90 to compute the length of time needed to complete a process in accordance with various data which have been stored in the file memory region 89 and various computing procedures, thus providing the length of time needed in the first and the second steps to execute the processing operations respectively. Such lengths of time are summed up in the first and the second steps and the result is stored in the processing time data memory regions 95 and 96 (step $S_4$). The resultant processing time is then summed up in the first and the second steps respectively, and the accumulated length of time is compared.

For example, if a longer length of time is needed to complete the processing operation in the first step, a certain step must be shifted from the first step to the second step in accordance with the step shifting program stored in the process shifting program memory region 91 so that the two steps' processing times may be rendered uniform. If it is not be possible for a certain step to correct a discrepancy in the length of time needed in the first and the second steps to execute the process by shifting the process to occur in the second step, rather than in the first step, then it may be appropriate to actuate the third tool rest allocating program, which is stored in the third tool rest process allocating program memory region 92, in order to reallocate the entire process so that the third tool rest 30 may assume the step in need of a longer period of time.

A process program is prepared utilizing the tool rest controlling programs stored in the first, the second and the third tool rests controlling program memory region 94, and programs stored in various programming regions 85, 86, 87, 88, etc., taking into account any interference between the first, the second and the third tools rests and the interval of waiting their times. This program which has been prepared is stored in the process program memory region 100. A verification program stored in the verification program memory region 93 is used to verify whether the processing time is properly specified after the third tool rest is ordered to take up the processing operation that was executed in the first step (Step $S_7$). If the result of the verification proves to be appropriate, the check procedure is terminated. On the other hand, if proved improper, the check procedure is repeated again, starting the process from step $S_6$.

ALTERNATIVE METHOD OF THE SECOND EMBODIMENT

Although the process operation is automatically split into the first and the second steps the first and the second spindles in the second embodiment as described above, the first step of splitting the process may be carried out by an operator or by a programmer based on one's experience and knowledge. Moreover, although all procedures, such as the computation of the processing time, the computation for comparative purposes, and the selection of tools may be carried out in accordance with an automatic program in the above second embodiment, they may be partially inputted and computed manually as needed. That is, it may be possible to arrange a tool position and a portion of the workpiece to receive an aiding process operation beforehand for the respective tools, and thereby allow other tasks to be performed semi-automatically, such as the decision of the timing to allow a process aiding action, the computation and the preparation of the program used to shift the processing section for aiding the processing operation.

In the second embodiment of the invention, the third tool rests has been described as serving to aid the workpiece processing operation executed by the first spindle 22, but it may also be possible to arrange the third tool rest such that it may aid the processing operation of the workpiece of the second spindle 23. It is further possible to make the processing time uniform between the two spindles 22 and 23 through an arrangement so that they may be alternatively served. Besides, although the workpiece is handed over from the first spindle 22 to the second spindle 2 directly in the second embodiment, the workpiece may be transferred by means of, for example, chucks provided on the third tool rest 30, a separate robot, etc.

It may also be possible to make an arrangement so that the length of the processing time needed to process the workpiece in the two spindles may be shortened by allowing the third tool rest 30 to aid the processing operation for the workpiece executed by the two spindles, even if the steps may restore the balance in the processing time by the shift and such a process aiding service by the third tool rest is not required. It is advisable to find out the shortest possible processing time which is possible by making the combined use of the step-shifting and the process aiding action offered by the third tool rest 30.

THIRD EMBODIMENT

Numerically-controlled Device

Figure 9:
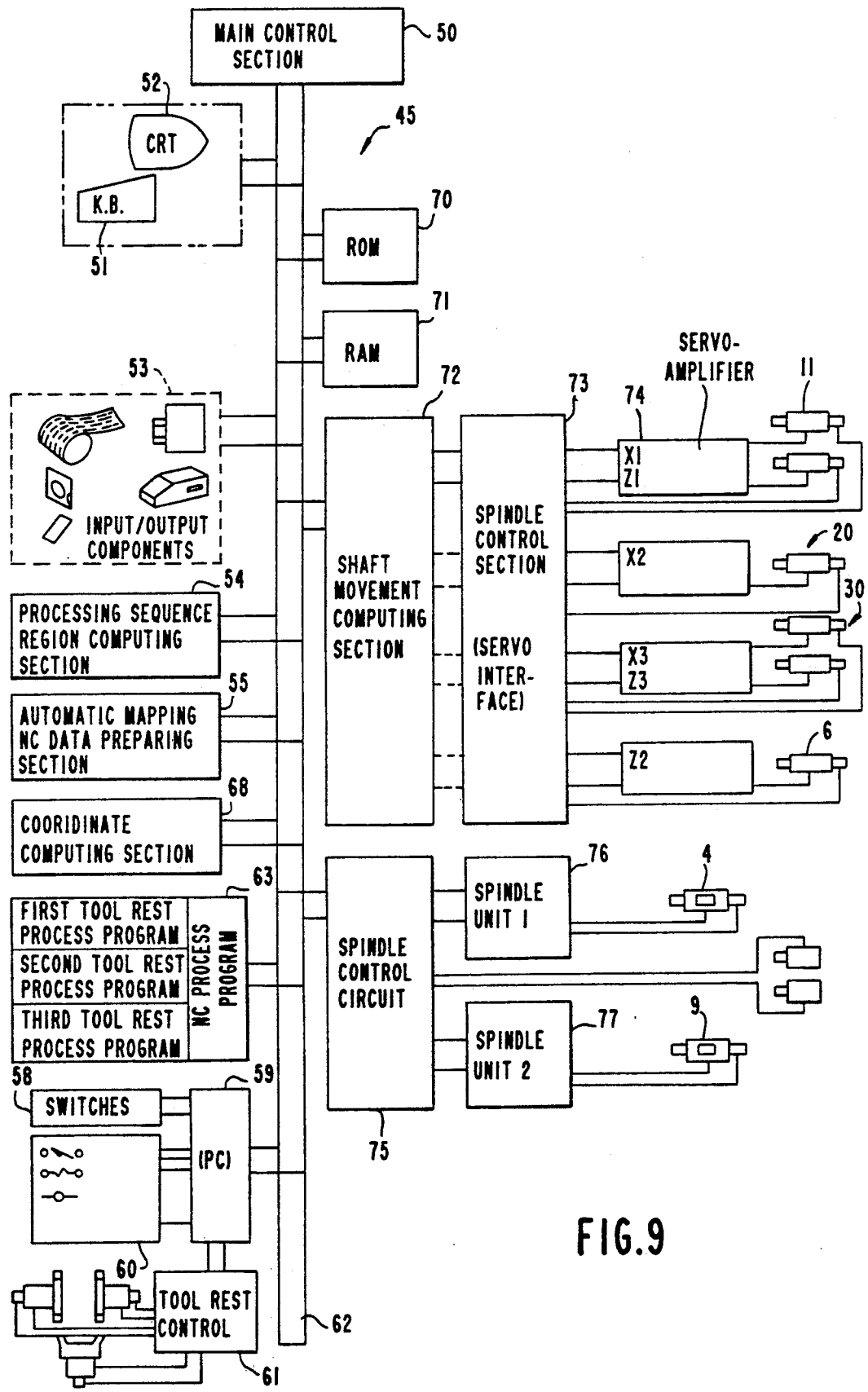
FIG. 9 is a functional block diagram generally illustrating a third embodiment of the system for the numerically-controlled lathe.

FIG. 9 is a system diagram showing how the numerically-controlled device 45 is operated. Basically, the embodiment of FIG. 9 is identical with that of FIG. 6 and their descriptions, as set forth hereinbelow, will focus on their differences. The processing programs, which are used for the processing operation by the first, the second and the third tool rests, are allocated and stored in the NC processing program memory 63.

The processing aid judgement section 55 operates to determine whether the first chuck 3 of the first spindle 22, or the second chuck 8 of the second spindle 23 should be aided by the third tool rest 30 to process the workpiece. If the T-code falls within the 5000S, then judgement section 55 determines that the first spindle should be aided, and if the T-code is in the 7000S, then it determines that the second spindle should be aided.

The coordinate computing section 68 thus operates to compute coordinates for each of the spindles and the tool rests, and especially for the third tool rest, the section 68 operates to compute the coordinate of the first spindle or the second spindle, depending on the judgement derived from the process aiding judgement section 55.

FOURTH EMBODIMENT

Figure 10:
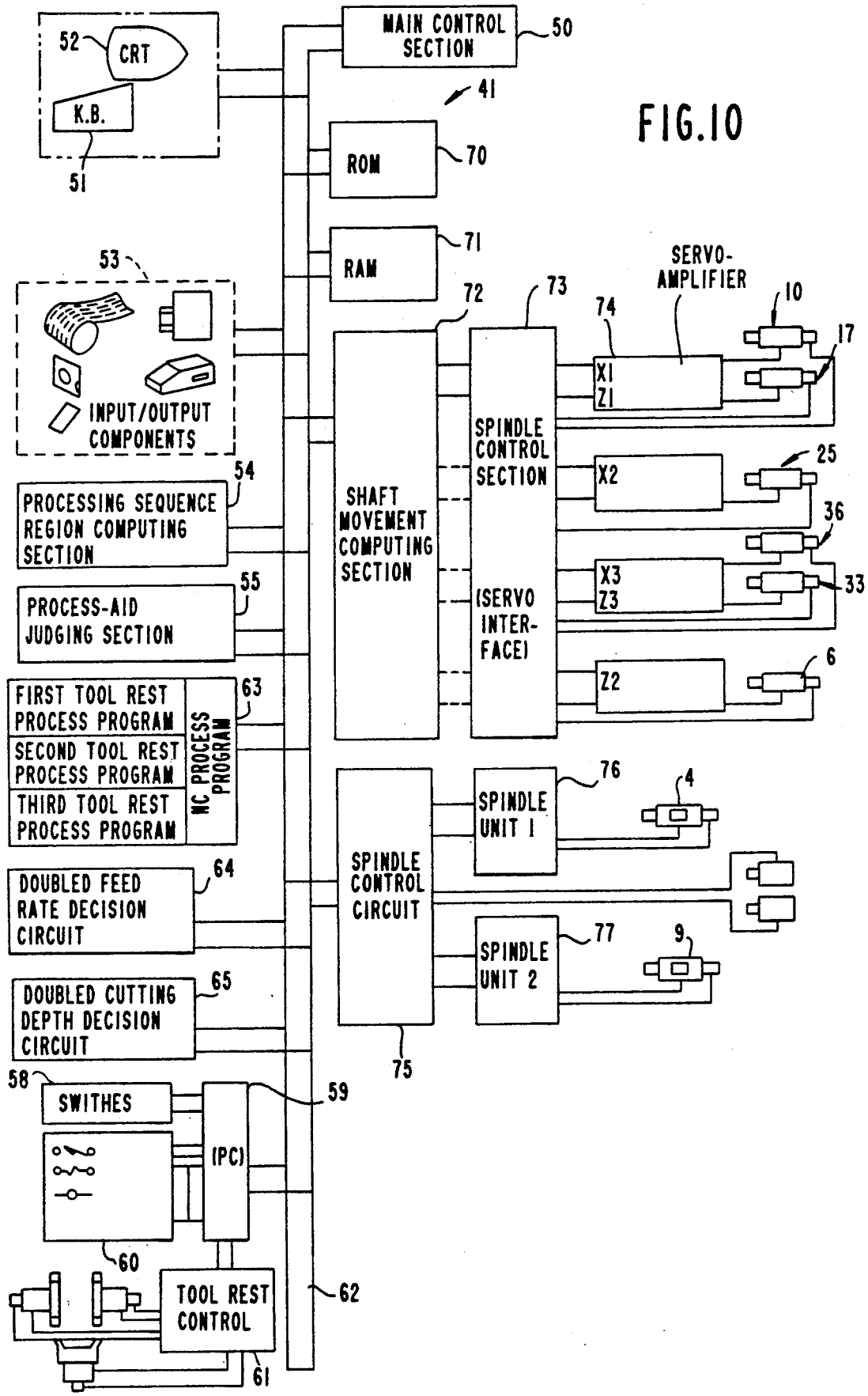
FIG. 10 is a functional block diagram generally illustrating a fourth embodiment of the system for the numerically-controlled lathe.

FIG. 10 is a system block diagram showing the function of the numerically-controlled device 41, which is essentially identical in construction with the numerically-controlled devices of the first and the second embodiments. The mechanical construction of the numerically-controlled lathe is the same as that used in the previous embodiments.

The processing program memory 63 is a memory which operates to store and retain all NC processing programs, and is stored in the first, the second and the third systems. The contents are read out to process the workpiece in response to an order issued from the main control section 50. The double feeding rate decision circuit 64 serves to double the speed given by the order in response to the double feeding rate mode issued during the waiting and the simultaneous processing steps by the first and the third systems, or by the second and the third systems as to be described later. The double cutting depth decision circuit 65 serves to double the cutting depth as specified, when such double-depth cutting mode is ordered, during the above-described simultaneous processing procedure.

WAITING AND DOUBLE FEEDING RATE PROCESSING, DOUBLE CUTTING DEPTH PROCESS

Figure 11:
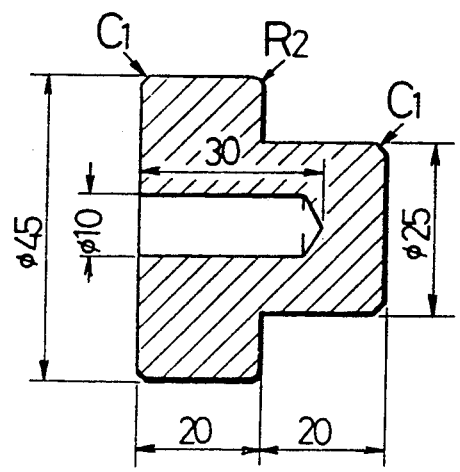
FIG. 11 is a cross-sectional view illustrating a sample workpiece.
Figure 12:
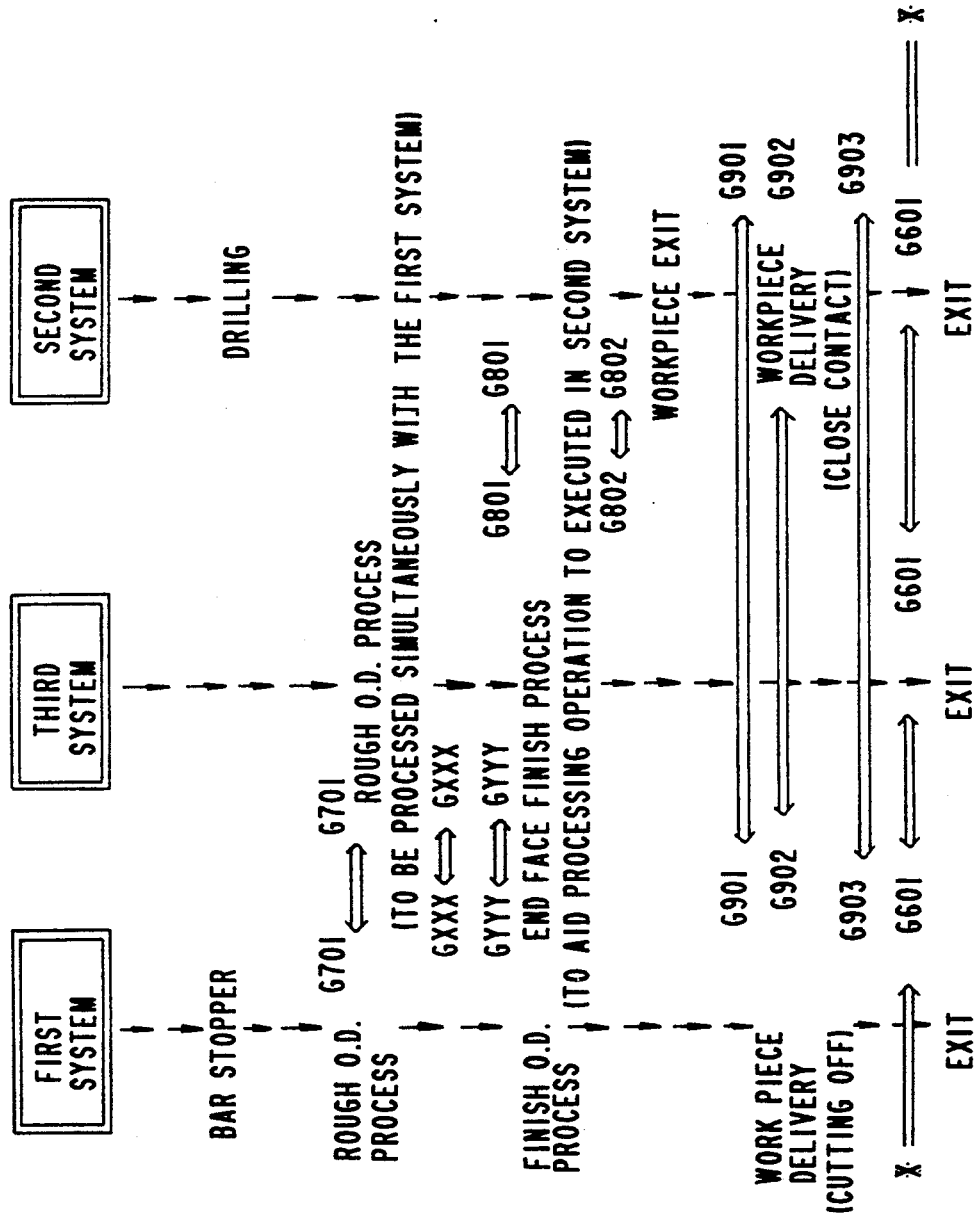
FIG. 12 is a time chart illustrating the processing sequence of each system.

To better understand the fourth embodiment, the process to execute a waiting mode and a double cutting rate, and the double cutting depth mode will be described hereinbelow with reference to a processing operation for a sample workpiece. FIG. 11 is a cross-sectional view illustrating a sample workpiece. FIG. 12 is a time-chart showing the processing operation and the processing time in each of its processing systems. The first process system executes a processing program of the workpiece on the first spindle 22 by means of the first tool rest 11. The second system executes a processing program of the workpiece on the second spindle 23 by means of the second tool rest 20. The third system executes a processing program 9 which is used by the third tool rest 20 to aid the processing operation otherwise carried out on the workpiece on the first spindle 22 or the workpiece on the second spindle 23.

To have time to wait for the arrival of the G-code means that an order to wait for the first and the second systems is carried out using the numerals in the G-9000S for various programs, and likewise, a similar order for the first and the third system is given through numerals in the G7000S, whereas the numerals of the G-6000S are used in the first, the second and the third systems. As shown in FIG. 12, the presence of the numeral G701 in the process program in the first system means the time when the first and the third systems must wait for the arrival of each other. The last digit numeral 1 of the G701 indicates a sequence for allowing a period for waiting. If a similar numeral G701 is also present in the third system, and when this program is available, the processing program is forced to stop further execution in order to wait for the completion of the process by the first system operations at the same code positions, even when the entire processing operation has been completed.

In this embodiment, the code GXXX is ordered in order to actuate the first and the third tool rests 11 and 30 to execute the feed processing operation at a speed two times faster than that of the ordinary operation, after the period of time waited for the issuance of the G701 is completed. That is, the GXXX represents an order used to indicate the double speed feeding mode, and when the GXXX is readout, a feeding speed which is two times faster than that in the feed order used in the subsequential processing program is specified from the CPU 50 through the double feed speed decision circuit 59. In the third system, the subsequential shifting order which is exactly the same as that used in the processing program of the first system is issued from the main control section 50, and the subsequential orders are given to specify the processing speed which is two times faster than that usually used to perform the same processing operation as that of the first system.

Figure 13:
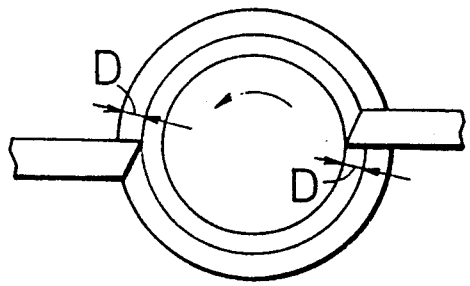
FIG. 13 is a view illustrating a processing operation taken to aid a double-depth cutting.

Furthermore, after the period of waiting for the arrival of the code G701 has elapsed, the code GAAA is ordered in the case where it is desired to perform the double cutting depth processing in the cutting direction (processing as shown in FIG. 13) as an aiding process.

The code GAAA for the first and the second systems represent the shape and the various processing conditions as specified for the workpiece. That is, the code GAAA　　P◯◯◯　　QXXX　U__　W__
　　　　　　　　　D__　　　　F__
　　　　　　　　　N◯◯◯　　... Sequence No.,
:
:

Provided the symbols as stated below contain the meaning as below.

P ◯ ◯ ◯: Sequence No. to start the shape designation

Q X X X: Sequence No. to complete the shape designation

U__ Finished Processing Allowance (X direction)

W__ Finished Processing Allowance (Y direction)

D__ Cutting Depth

F__ Feeding Operation

In the third system, the code GBBB is ordered in response to the code GAAA. That is, when the code GBBB is ordered, a processing program which is the same as that used for the first system is issued for the third system from the main control section 50, and thus the cutting depth $\theta$ is double, and than a processing operation is performed simultaneously with that of the first system.

The present invention has been described relating to the period of waiting and the double feed rate processing operation as well as the double cutting depth processing operation to be done between the first and the second system, but as is obvious to those skilled in the art from the above-description, this operating mode may also be effectively provided between the second and the third systems.

ALTERNATIVE FOURTH EMBODIMENT

The first headstock 2 of the above-described embodiment is not movable and is fixed in position on the bed. Although the second headstock 5 and the second tool rest 20 are made movable in a uni-axial direction, an alternative embodiment may be possible, where in the second headstock 5 is fixed and the second tool rest 20 may be made movable in bi-axial directions. Although three tool rests and two spindles are provided, this invention may well consist of a single spindle and two tool rests, as is know from the description above.

In the embodiment of the numerically-controlled device as described above, the workpiece feeding speed is doubled by means of the double feeding speed decision circuit 64 and the double cutting depth decision circuit 65, where such a double feeding mode is desired. Alternatively, the cutting depth may be doubled automatically by rewriting the data on the feeding amount and the cutting depth contained in the processing program and then issuing an order accordingly to the axial movement computing section 72, upon the double speed order being issued, without the use of these decision circuits.

FIFTH EMBODIMENT

Numerically-controlled Device

Figure 14:
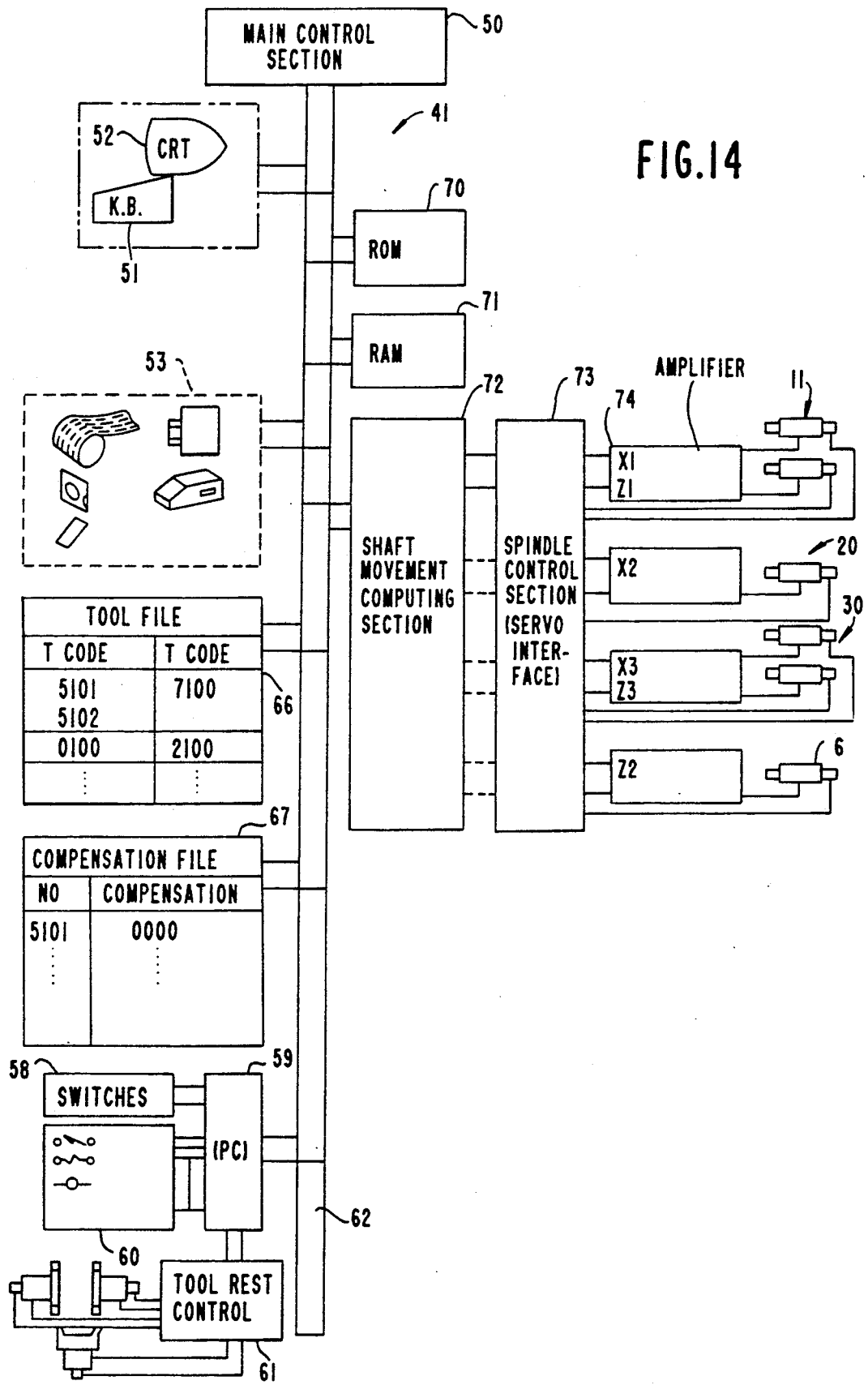
FIG. 14 is a functional block diagram generally illustrating a fifth embodiment of the system for the numerically-controlled lathe.

FIG. 14 is a system block diagram showing the function of the numerically-controlled device of the fifth embodiment of the invention, which is essentially identical in construction with the first, the second and the third embodiments, i.e., those embodiments as shown in FIG. 6, FIG. 9 and FIG. 10. The mechanical construction of the embodiment is the same as that of the first embodiment.

In the tool file 66, various data relating to the type, shape and the number of the tools are stored and retained in the form of the T-codes. In the compensation file 67, compensation values are retained according to the sizes of the tool, along with the parameters, Z04 and X04, which have been described above.

The main control section 50 is adapted to change the coordinate system so that the third tool rest 30 may follow the movement of the second spindle 23 in the direction of Z2 when the third tool rest 30 is aiding the processing operation of the second spindle 23. This change of the coordinate may be achieved by taking up parameters X04 AND Z04 from the compensation file 67 and ordering them to the axial shifting computing section 72.

SIXTH EMBODIMENT

Figure 15:
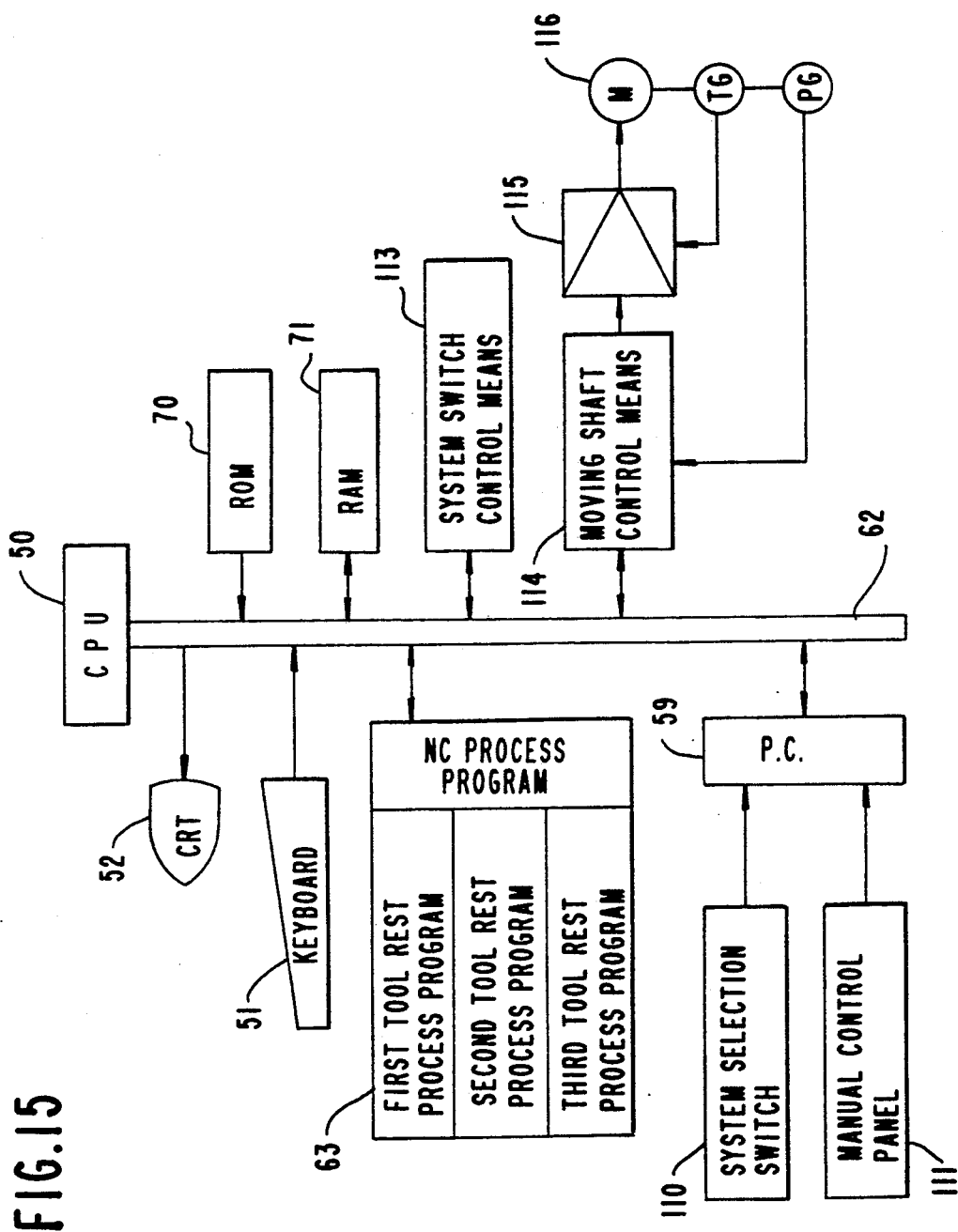
FIG. 15 is a functional block diagram generally illustrating a sixth embodiment of the system for the numerically-controlled lathe.

FIG. 15 is a system block diagram showing the function of the numerically-controlled device of the sixth embodiment of the invention. A system selection switch 110 is used to select a system which should be made operative in order to check the program for any defect or to execute the processing operation of the workpiece, and is connected to the programmable controller 59.

A manual control panel 111 has switches arranged in a group thereon which are used for the entry of an order into the programmable controller 59, and the control panel is mainly used to operate the numerically-controlled lathe manually. The mode of the system selection switch 110 to select a system is stored in the RAM 71 via the programmable controller 59.

The programmable controller 59 is a sequence-controller which is able to be programmed to control the program which is used to control various control equipment such as hydraulic devices, etc. The ROM 70 is a memory in which data needed to operate the numerically-controlled device are stored, along with various programs. The RAM 71 is a memory in which various parameters, and the tool offset amount, are stored permanently or temporarily.

The system switching control means 113 is used to control the numerically-controlled lathe in accordance with the mode of the system selection switch 110 used to select an operable system. The motor 116 is a servo-motor used to drive various control shafts. This motor 116 is connected with the bus 62 via an amplifier 115. This motor 116 is shown as a representative of the servo-motor shown in FIG. 2.

SYSTEM SELECTION SWITCH

Figure 16:
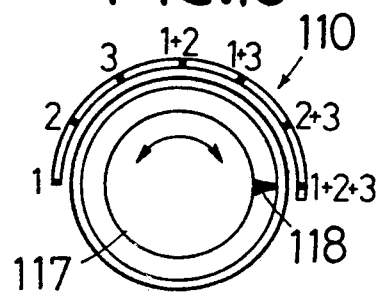
FIG. 16 is a view illustrating a system selection switch.

FIG. 16 is a view of the system selection switch 110. This system selection switch is arranged on the control panel 40 (see FIG. 2). Upon this system selection switch being selected, the numerically-controlled device exclusively actuates the system which has been selected. A system may be selected by turning the dial so that the arrow mark 118 put on the dial may align with any of the marks "1", "2", "3", "1+2", "1+3", "2+3", or "1+2+3", as indicated on the control panel 40. The mark "1" represents a position for selecting the first system, whereas the marks "2" and "3" represent positions for selecting the second and the third systems respectively. The mark "1+2" represents a selection for actuating the first and the second systems. Marks such as "1+3", "2+3", or "1+2+3", similarly represent a selection for actuating the respective systems.

CHECKING PROGRAM

The lathe must be operated as follows to check a program for any defect or to cut a workpiece for a trial run.

(1) Independent Operation

The first system, the second system and the third system are operated independently.

(2) Complex Operation

The complex operation is performed combining the three respective systems. This complex operation includes the following types and can be selected by means of the system selection switch 110 (see FIG. 16).

(a) The simultaneous operation of the first system with the second system.

(b) The simultaneous operation of the first system with the third system (four-axis processing at the first spindle).

(c) The simultaneous operation of the second system with the third system (four-axis processing at the second spindle).

(3) Full-automatic operation

Various procedures are available to check the programs for any defect, but are normally taken in the following order.

a. The first system.

b. The simultaneous operation of the first system with the third system.

c. The second system.

d. The simultaneous operation of the second system with the third system.

e. The full-automatic operation.

With the above procedures, any possible interference between tools and any mistake caused in preparing the program are checked.

The present invention operates as follows. First, the operator prepares a respective NC program, which is suitable for use to each of the systems, and stores it by system in the NC program memory 63 in the numerically-controlled device. The NC program for the respective system consists of orders for the interval of waiting and for the initiation of a processing operation. In the case of selecting the third system, i.e., the third tool rest 30, the following G code is used in the program to discriminate whether the first or the second system, i.e., the first tool 11 or the second tool ret 20, should be aided. The GXXX code represents that the subsequent block needs a complex operation combining the first system + the third system, the GYYY code represents that the subsequent block needs a complex operation combining the second system + the third system, and the code GZZZ represents that the subsequent block is in need of cancelling the complex operation, i.e., needs the third system operation. These codes, GXXX, GYYY and GZZZ, are modal codes, that is, when an order is given in the G-function, a certain state is retained and invariably maintained unless a particular order is issued.

The program checking sequence is then taken by setting the dial 117 of the system selection switch 110 at its proper turning position. Upon the desired system being selected by means of the system selection switch 110, data are stored in the RAM via the programmable controller 61 to indicate which system has been selected.

The system selection switching control means 113 actuates the numerically-controlled lathe as follows, when it checks the program or the processing performance to be provided by the lathe, by reading out a system which has been selected and stored in the RAM 71.

(1) When the first system has been selected, the control means actuates only the first tool rest 11 of the first headstock 2.

(2) When the second system has been selected, the control means activates the second headstock 5 and the second tool rest 20.

(3) When the third system has been selected, the control means actuates the third tool rest 30.

(4) When the first and the second system have been selected, the control means actuates the first tool rest 11, the second tool rest 20 and the second headstock 5.

(5) When the first and the third systems have been selected, the control means actuates the first tool rest 11 and the third tool rest 30. However, the third tool rest 30 does not aid the processing operation of the second system (the second headstock 5).

(6) When the second and the third system have been selected, the control means actuates the second tool rest 20, the second headstock 5 and the third tool rest 30. However, the third tool rest 30 does not aid the processing operation of the first system (the first headstock 2).

(7) When the first system, the second system and the third system have been selected, the control means actuates all of the three systems to realize a full-automatic operation.

As described above, when the system selection switch has been actuated in the third system, a program usable in a complex operating mode other than this one selected is skipped. This skipping action will be described in detail herein below, with reference to FIG. 5. FIG. 17 is a view showing the operative state of the third system (the third tool rest 30) at this moment, wherein the relationship between the G-codes used to discriminate the system to be allocated, and the system selection switches, is shown.

The NC program usable by the third system as shown in FIG. 17 will be described hereinbelow. The Codes GXXX, GYYY and GZZZ are used to discriminate the systems, and are modal codes. The block from the code 01234 to the code immediately preceding the code GXXX represents the NC program which operates only the third system. The block from the code GXXX to the code immediately preceding the code GYYY represents the NC program which operates the first and the third systems in a complex mode. The block from the code GYY to the code immediately preceding the code GXXX represents the program which operates the second and the third systems in a complex mode. The block from the code GXXX to the code immediately preceding the code GZZZ represents the NC program which operates the first and the second systems in a complex mode. The block from the code GZZZ to the code immediately preceding the code M30 represents the NC program which operates only the third system.

The third system becomes operative as follows, depending on the state at which the system selection switch has been actuated, at the time when the NC program has been executed.

When the first system, the second system, or the first and the second system in combination have been selected by means of the system selection switch 110, the above-described NC program is not executed. When the third system, or the first, the second and the third systems in combination have been selected by means of the system selection switch 110, the NC program is completely executed. When the first and the second system have been selected, the NC program from the code GYYY to the code immediately preceding the code GXXX, that is, the NC program used to operate the second and the third systems in a complex mode, is skipped. When the second and the third systems have been selected by means of the system selection switch 110, the NC program from the code GXXX to the code immediately preceding the code GYYY, and the NC program from the code GXXX to the code immediately preceding the code GZZZ, that is, any NC program which operate the first and the third systems in a complex mode, are skipped.

We claim:

1. A numerically-controlled lathe, comprising:
a bed (1);
a first headstock (2) fixed to said bed;
a first spindle (22) freely and rotatably supported in said first headstock (2);
a first spindle motor (4) for rotatably driving said first spindle (22);
a second headstock (5) arranged on said bed (1) to face said first headstock (2) and being drivably controlled in a same direction with an axis of said first spindle (22);

a first servo-motor (6) for driving said second headstock (5) in at least said same direction;

a second spindle (23) with a same axis of said first spindle (22) freely and rotatably supported in said second headstock (5);

a second spindle motor (9) for rotatably driving said second spindle (23);

a first tool rest (11) which is drivably controlled in at least two perpendicularly intersecting directions, said first tool rest for processing a workpiece mounted on said first spindle (22);

second and third servo-motors (10, 17) for driving said first tool rest (11) in at least said two perpendicularly intersecting directions;

a second tool rest (2) drivably controlled in at least a single direction for processing the workpiece mounted on said second spindle (23);

a fourth servo-motor for driving said second tool rest in at least said single direction;

a third tool rest (3) drivably controlled in at least two perpendicularly intersecting directions for processing the workpiece simultaneously in association with said first tool rest (11) or said second tool rest (2) to aid processing of the workpiece on said first spindle (22) or said second spindle (23) during its processing operation of the workpiece;

a fifth and a sixth servo-motors (33, 37) for driving said third tool rest (30) in at least said two perpendicularly intersecting directions;

a numerically-controlled device (41) which is adapted to select a third system processing operation in order to aid a first system processing operation for processing the workpiece of said first spindle (22) by means of said first tool rest (11), or a second processing system for processing the workpiece of said second spindle (23) by means of said second too rest (20), and which is adapted to control the simultaneous operation of said first system processing operation with the second system processing operation, or said first processing operation with said third system processing operation, or said second system processing operation with said third system processing operation, or said first system processing operation, with both said second system processing operation and third system processing operation.

2. A numerically-controlled lathe, comprising:

a bed (1);

a first headstock (2) fixed to said bed;

a first spindle (22) freely and rotatably supported in said first headstock (2);

a first spindle motor (4) for rotatably driving said first spindle (22);

a second headstock (5) arranged on said bed (1) to face said first headstock (2) and being drivably controlled in same direction with axis of said first spindle (22);

a first servo-motor (6) for driving said second headstock (5) in at least said same direction;

a second spindle (23) with same axis of said first spindle (22) freely and rotatably supported in said second headstock (5);

a second spindle motor (9) for rotatably driving said second spindle (23);

a first tool rest (11) which is drivably controlled in at least two perpendicularly intersecting directions, said first tool rest for processing a workpiece mounted on said first spindle (22)

second and third sever-motors (10, 17) for driving said first tool rest (11) in at least said two perpendicularly intersecting directions;

a second tool rest (2) drivably controlled in at least a single direction for processing the workpiece mounted on said second spindle (23);

a fourth servo-motor for driving said second tool rest in at least said single direction;

a third tool rest (30) drivably controlled in at least two perpendicularly intersecting directions for processing the workpiece simultaneously in association with said first tool rest (11) or said second tool rest (2) to aid processing of the workpiece on said first spindle (22) or said second spindle (23) during its processing operation of the workpiece;

a fifth and a sixth servo-motors (33, 37) for driving said third tool rest (3) in at least said two perpendicularly intersecting directions;

a first program memory means (100) for storing a processing program used to process said workpiece mounted on said first spindle (22) by means of said first tool rest (11);

a second program memory means (100) for storing a processing program used to process said workpiece mounted on said second spindle (23) by means of said second tool rest (20);

processing time-computing means (81, 90) for computing the time needed for said first tool rest (11) and said second tool rest (2) to process the workpiece;

step shifting means (91) for comparing the time needed for said first tool rest (11) and that needed for said second tool rest (2) to process the workpiece respectively, and then allocating the steps so that the processing time may be able to equal between them;

program memory regions (92, 93), (93) to equal the time needed for said first spindle (22) and said second spindle (23) to process the workpiece, by causing the third tool rest (3) to take up a certain processing operation for the workpiece otherwise to be carried out by said first spindle (22) or said second spindle (23), when the comparative results and the allocation of the process time are not equal between said first spindle and said second spindle.

* * * * *